US012206610B2

(12) United States Patent
Bao et al.

(10) Patent No.: US 12,206,610 B2
(45) Date of Patent: Jan. 21, 2025

(54) REFERENCE SELECTION FOR DOUBLE DIFFERENCE POSITIONING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 550 days.

(21) Appl. No.: 17/484,143

(22) Filed: Sep. 24, 2021

(65) Prior Publication Data

US 2022/0231805 A1   Jul. 21, 2022

Related U.S. Application Data

(60) Provisional application No. 63/138,332, filed on Jan. 15, 2021.

(51) Int. Cl.
| | |
|---|---|
| *H04L 5/00* | (2006.01) |
| *H04W 24/10* | (2009.01) |
| *H04W 28/24* | (2009.01) |
| *H04W 64/00* | (2009.01) |
| *H04W 84/06* | (2009.01) |
| *H04W 4/029* | (2018.01) |

(52) U.S. Cl.
CPC ........... *H04L 5/0048* (2013.01); *H04W 24/10* (2013.01); *H04W 28/24* (2013.01); *H04W 64/003* (2013.01); *H04W 84/06* (2013.01); *H04W 4/029* (2018.02)

(58) Field of Classification Search
CPC .. H04L 5/0048; H04W 24/10; H04W 64/003; H04W 64/00; H04W 4/029; H04W 28/06; H04W 28/24; H04W 84/06
See application file for complete search history.

(56) References Cited

U.S. PATENT DOCUMENTS

2012/0314604 A1* 12/2012 Siomina ................ H04W 64/00
                                                            370/252
2013/0321210 A1* 12/2013 Werner ................. G01S 5/0236
                                                            342/451

(Continued)

OTHER PUBLICATIONS

CATT: "Discussion on Accuracy Improvements by Mitigating UE Rx/Tx and/or gNB Rx/Tx Timing Delays", 3GPP TSG RAN WG1 #105-e, R1-2104520, 3rd Generation Partnership Project, Mobile Competence Centre, 650, Route Des Lucioles, F-06921 Sophia-Antipolis Cedex, France, vol. RAN WG1, No. e-Meeting, May 19, 2021-May 27, 2021, May 12, 2021, XP052010843, 21 Pages.

(Continued)

*Primary Examiner* — Kwang B Yao
*Assistant Examiner* — Bradley D Lytle, Jr.
(74) *Attorney, Agent, or Firm* — QUALCOMM Incorporated

(57) ABSTRACT

Techniques are provided for selecting reference nodes for use in a double difference positioning method. An example method of determining compensation values for positioning reference signals includes receiving positioning reference signal measurements from the one or more reference nodes, and determining one or more compensation values based at least in part on the positioning reference signal measurements.

26 Claims, 17 Drawing Sheets

(56) References Cited

U.S. PATENT DOCUMENTS

| | | | | |
|---|---|---|---|---|
| 2014/0057664 | A1* | 2/2014 | Pei | G01S 5/0236 |
| | | | | 455/456.5 |
| 2014/0349582 | A1* | 11/2014 | Xiao | G01S 5/10 |
| | | | | 455/67.11 |
| 2016/0095080 | A1* | 3/2016 | Khoryaev | G01S 5/0284 |
| | | | | 455/456.1 |
| 2016/0095092 | A1* | 3/2016 | Khoryaev | G01S 5/0289 |
| | | | | 370/329 |
| 2020/0052845 | A1* | 2/2020 | Chuang | H04L 5/0048 |
| 2020/0267685 | A1* | 8/2020 | Qi | H04B 7/0617 |

OTHER PUBLICATIONS

Cewit, et al., "Discussion on Mitigation of Tx-Rx Timing Delays", R1-2103682, 3GPP TSG RAN WG1 Meeting #104b-e, E-meeting, Apr. 12-Apr. 20, 2021, 5 Pages.

Chair A.H., (Ericsson): "Session Notes 8.5 (NR Positioning Enhancements)", 3GPP TSG-RAN WG1 Meeting #104b-e, R1-2103982, 3rd Generation Partnership Project, Mobile Competence Centre, 650, Route Des Lucioles, F-06921 Sophia-Antipolis Cedex, France, vol. RAN WG1, No. e-Meeting, Apr. 12, 2020-Apr. 20, 2020, Apr. 28, 2021, XP051998291, 5 Pages.

International Search Report and Written Opinion—PCT/US2021/060489—ISA/EPO—Feb. 22, 2022.

Moderator (CATT): "FL Summary #4 for Accuracy Improvements by Mitigating UE Rx/Tx and/ or gNB Rx/Tx Timing Delays", 3GPP TSG RAN WG1 Meeting #104bis-e, R1-2103992, 3rd Generation Partnership Project, Mobile Competence Centre, 650, Route Des Lucioles, F-06921 Sophia-Antipolis Cedex, France, vol. RAN WG1, No. e-meeting, Apr. 12, 2021-Apr. 20, 2021, Apr. 20, 2021, XP051996599, 85 Pages.

Qualcomm Incorporated: "Enhancements on Timing Error Mitigations for Improved Accuracy", 3GPP TSG RAN WG1 #104b-e, R1-2103170, e-Meeting, Apr. 12-20, 2021, Apr. 7, 2021 (Apr. 7, 2021) Sections 2.1, 2.3.1, 4.2, pp. 1-20, the whole document.

* cited by examiner

REFERENCE SELECTION FOR DOUBLE DIFFERENCE POSITIONING

CROSS-REFERENCE TO RELATED APPLICATION

The application claims the benefit of U.S. Provisional Application No. 63/138,332, filed on Jan. 15, 2021, entitled "REFERENCE SELECTION FOR DOUBLE DIFFERENCE POSITIONING," which is assigned to the assignee hereof, and the entire content of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. In industrial applications, the location of a mobile device may be necessary for asset tracking, robotic control, and other kinematic operations which may require a precise location of an end effector. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements.

SUMMARY

An example method of determining compensation values for positioning reference signals according to the disclosure includes determining one or more reference nodes based on a coarse location of a target user equipment, receiving positioning reference signal measurements from the one or more reference nodes, and determining one or more compensation values based at least in part on the positioning reference signal measurements.

Implementations of such a method may include one or more of the following features. The one or more compensation values may be provided to the target user equipment. Determining the one or more reference nodes may include determining one or more positioning reference signal resources based on the coarse location of the target user equipment. Determining the one or more reference nodes may include determining the one or more positioning reference signal resources utilizing a detectable line-of-sight path to the one or more reference nodes. Determining the one or more reference nodes may include determining a reference node with a greatest number of the one or more positioning reference signal resources with the detectable line-of-sight path to the reference node. Determining the one or more reference nodes may include determining a reference node with a greatest number of the one or more positioning reference signal resources that are detectable by the reference node. Determining the one or more reference nodes may include determining a reference nodes with a maximum number of overlapped positioning reference signal measurements with the target user equipment. The one or more compensation values may include a time compensation value associated with a time of arrival of a positioning reference signal resource. The one or more compensation values may include a time compensation value based on a reference signal time difference associated with two positioning reference signal resources. A location management function, a transmission/reception point, and/or a user equipment may be configured for receiving the positioning reference signal measurements from the one or more reference nodes, and for determining the one or more compensation values. The coarse location information associated with the target user equipment may be an identification value associated with a current serving cell. The coarse location of the target user equipment may be received from a network station. Positioning reference signal resource configuration information may be provided to the target user equipment based at least in part on the one or more reference nodes.

An example method of determining a location with a user equipment according to the disclosure includes measuring one or more positioning reference signals, receiving compensation values associated with the one or more positioning reference signals from a network entity, determining one or more compensated positioning reference signal measurements based at least in part on measurement values for each of the one or more positioning reference signals and the associated compensation values, and determining the location based at least in part on the one or more compensated positioning reference signal measurements.

Implementations of such a method may include one or more of the following features. Coarse location information may be provided to the network entity. Measuring the one or more positioning reference signals may include determining a time of arrival for a positioning reference signal. Measuring the one or more positioning reference signals may include determining a reference signal time difference for at least two positioning reference signals. Receiving the compensation values may include receiving the compensation values from a location server. Receiving the compensation values may include receiving the compensation values from a transmission/reception point. Receiving the compensation values may include receiving the compensation values from a reference node. Receiving the compensation values may include receiving the compensation values via a sidelink protocol. Receiving the compensation values may include receiving the compensation values from a user equipment via a sidelink protocol. Receiving the compensation values may include receiving the compensation values via one or more radio resource control messages. The compensation values may be based on positioning reference signal measurements obtained from a plurality of reference nodes. Determining the location may include providing the one or more compensated positioning reference signal measurements to a location server and receiving the location from the location server.

An example apparatus according to the disclosure includes a memory, at least one transceiver, at least one processor communicatively coupled to the memory and the at least one transceiver, and configured to determine one or more reference nodes based on a coarse location of a target user equipment, receive positioning reference signal measurements from the one or more reference nodes, and determine one or more compensation values based at least in part on the positioning reference signal measurements.

Implementations of such an apparatus may include one or more of the following features. The at least one processor may be further configured to provide the one or more compensation values to the target user equipment. The at least one processor may be further configured to determine one or more positioning reference signal resources based on the coarse location of the target user equipment. The at least one processor may be further configured to determine the one or more positioning reference signal resources utilizing a detectable line-of-sight path to the one or more reference nodes. The at least one processor may be further configured to determine a reference node with a greatest number of the one or more positioning reference signal resources with the detectable line-of-sight path to the reference node. The at least one processor may be further configured to determine a reference node with a greatest number of the one or more positioning reference signal resources that are detectable by the reference node. The at least one processor may be further configured to determine one or more reference nodes configured to receive at least one of the one or more positioning reference signal resources. The one or more compensation values may include a time compensation value associated with a time of arrival of a positioning reference signal resource. The one or more compensation values may include a time compensation value based on a reference signal time difference associated with two positioning reference signal resources. The coarse location information associated with the target user equipment may be an identification value associated with a current serving cell. The at least one processor may be further configured to receive the coarse location of the target user equipment from a network station. The at least one processor may be further configured to provide positioning reference signal resource configuration information to the target user equipment based at least in part on the one or more reference nodes.

An example apparatus according to the disclosure includes a memory, at least one transceiver, at least one processor communicatively coupled to the memory and the at least one transceiver, and configured to measure one or more positioning reference signals, receive compensation values associated with the one or more positioning reference signals from a network entity, determine one or more compensated positioning reference signal measurements based at least in part on measurement values for each of the one or more positioning reference signals and the associated compensation values, and determine a location based at least in part on the one or more compensated positioning reference signal measurements.

Implementations of such an apparatus may include one or more of the following features. The at least one processor may be further configured to provide coarse location information to the network entity. The at least one processor may be further configured to determine a time of arrival for a positioning reference signal. The at least one processor may be further configured to determine a reference signal time difference for at least two positioning reference signals. The at least one processor may be further configured to receive the compensation values from a location server. The at least one processor may be further configured to receive the compensation values from a reference node. The at least one processor may be further configured to receiving the compensation values via a sidelink protocol. The at least one processor may be further configured to receive the compensation values via one or more radio resource control messages. The compensation values may be based on positioning reference signal measurements obtained from a plurality of reference nodes. The at least one processor may be further configured to provide the one or more compensated positioning reference signal measurements to a location server and receiving the location from the location server.

An example apparatus for determining compensation values for positioning reference signals according to the disclosure includes means for determining one or more reference nodes based on a coarse location of a target user equipment, means for receiving positioning reference signal measurements from the one or more reference nodes, and means for determining one or more compensation values based at least in part on the positioning reference signal measurements.

An example apparatus for determining a location with a user equipment according to the disclosure includes means for measuring one or more positioning reference signals, means for receiving compensation values associated with the one or more positioning reference signals from a network entity, means for determining one or more compensated positioning reference signal measurements based at least in part on measurement values for each of the one or more positioning reference signals and the associated compensation values, and means for determining the location based at least in part on the one or more compensated positioning reference signal measurements.

An example non-transitory processor-readable storage medium comprising processor-readable instructions to cause one or more processors to determine compensation values for positioning reference signals according to the disclosure includes code for determining one or more reference nodes based on a coarse location of a target user equipment, code for receiving positioning reference signal measurements from the one or more reference nodes, and code for determining one or more compensation values based at least in part on the positioning reference signal measurements.

An example non-transitory processor-readable storage medium comprising processor-readable instructions to cause one or more processors to determine a location with a user equipment according to the disclosure includes code for measuring one or more positioning reference signals, code for receiving compensation values associated with the one or more positioning reference signals from a network entity, code for determining one or more compensated positioning reference signal measurements based at least in part on measurement values for each of the one or more positioning reference signals and the associated compensation values, and code for determining the location based at least in part on the one or more compensated positioning reference signal measurements.

Items and/or techniques described herein may provide one or more of the following capabilities, as well as other capabilities not mentioned. Base stations in a communication network may be configured to transmit positioning reference signals. One or more reference nodes may be configured to receive the positioning reference signals and determine compensation values for the positioning reference signals. The compensation values may be provided to user equipment to improve the accuracy of positions based on the reference signals. A location server may be configured to select one or more reference nodes to obtain compensation values for a user equipment. The selection of the reference nodes may be based on the positioning resource signals the reference nodes are capable of receiving. The compensation values may be provide to the user equipment via the communication network. The reference node may be configured to provide compensation values via sidelink protocols. The accuracy of position estimates for user equipment may be improved. Other capabilities may be provided and not every implementation according to the disclosure must provide any, let alone all, of the capabilities discussed.

DETAILED DESCRIPTION

Techniques are discussed herein for selecting reference nodes for use in a double difference positioning method. A reference node may be a user equipment (UE), or another station such as a base station (BS) configured to receive positioning reference signals (PRSs) and communicate with a wireless network. The reference node is in a known location relative to other stations and is configured to measure positioning reference signals (PRSs) transmitted by the other stations. Since the distance between the reference node and the other stations is known, the theoretical propagation times for the positioning reference signals is known. Deviations between the theoretical propagation times and the time of flight measured by a reference note may be used to compensate time of flight measurements obtained by a proximate UE with an unknown location. The compensation information may be based on time of arrival (ToA) measurements for a PRS or on reference signal time differences (RSTD) for two or more PRS received by the reference node. A reference node may be selected based on an association with a base station, and/or the detection of one or more positioning reference signals transmitted by one or more base stations. A reference node may be configured to provide PRS information and compensation information to a target UE. The reference node may utilize a location server via network communication protocols, and/or one or more sidelink technologies to communicate directly or indirectly with the target UE. A reference node may be configured to provide the compensation information to a location server. These techniques and configurations are examples, and other techniques and configurations may be used.

Figure 1:
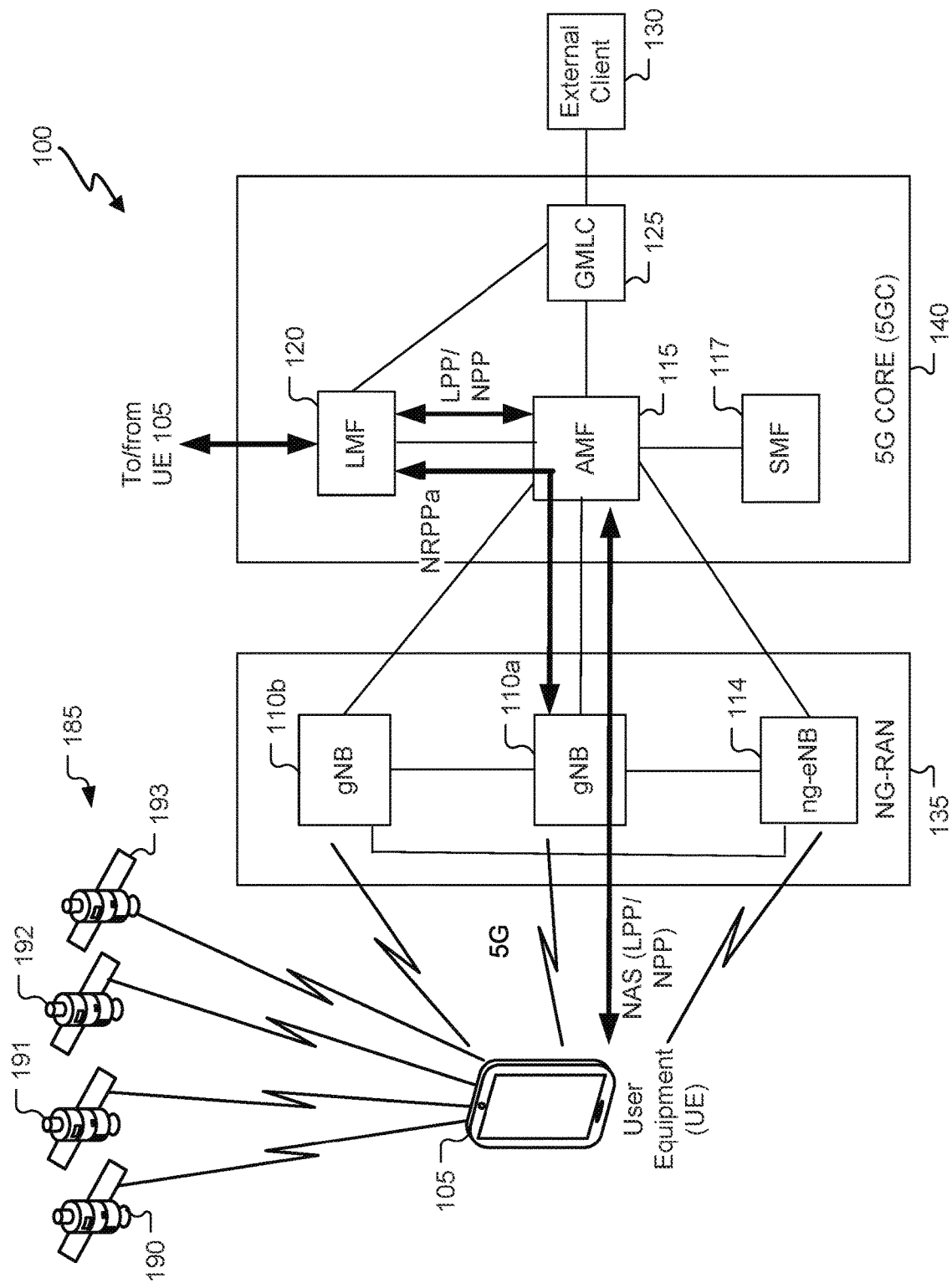
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs, such as the gNB 110*a*, gNB 110*b*, ng-eNB 114 may each comprise one or more TRPs. For example, each sector within a cell of a BS may comprise a TRP, although multiple TRPs may share one or more components (e.g., share a processor but have separate antennas). The communication system 100 may include only macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
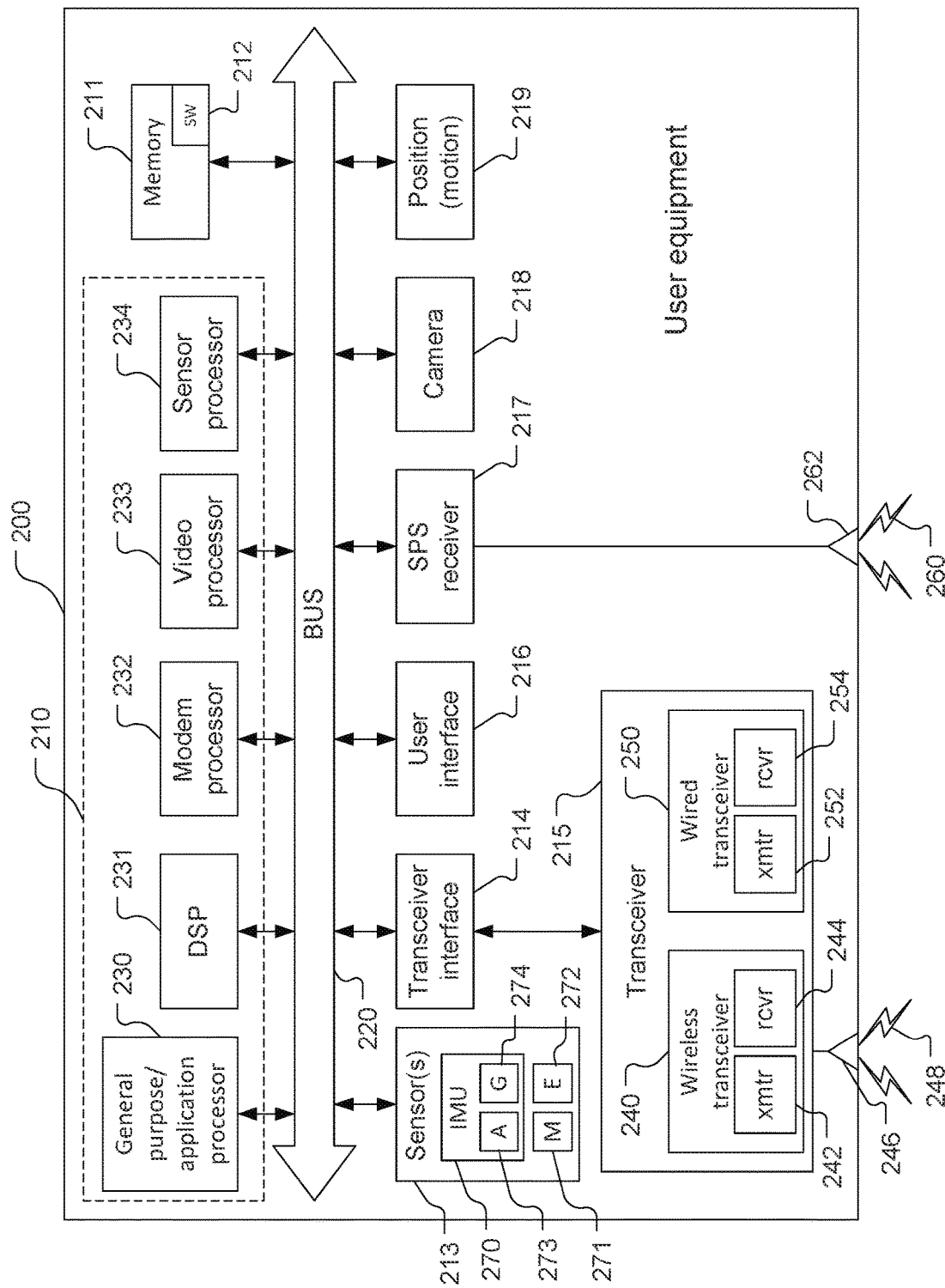
FIG. 2 is a block diagram of components of an example user equipment.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) use to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the position (motion) device PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-Everything (V2X) (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-processor 230 and the memory 211.

Figure 3:
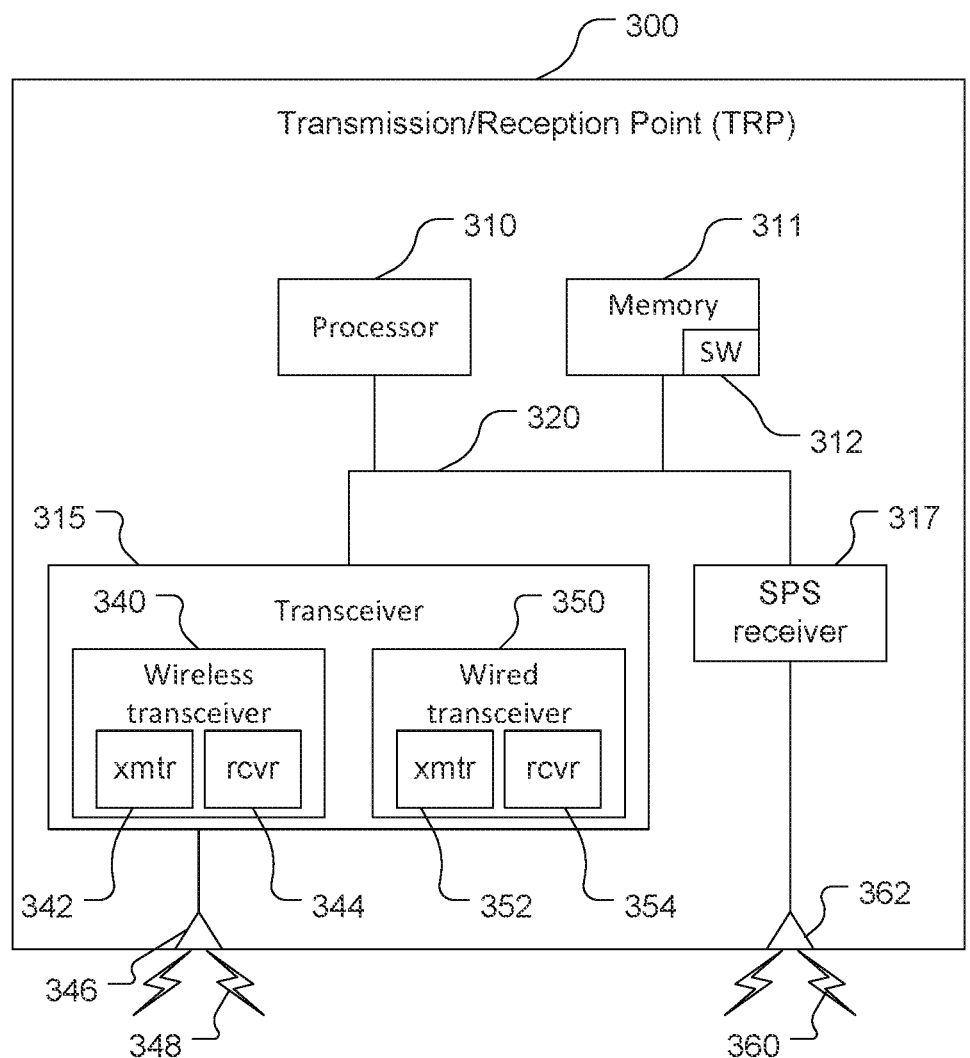
FIG. 3 is a block diagram of components of an example transmission/reception point.

Referring also to FIG. 3, an example of a TRP 300 of the BSs (e.g., gNB 110*a*, gNB 110*b*, ng-eNB 114) comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
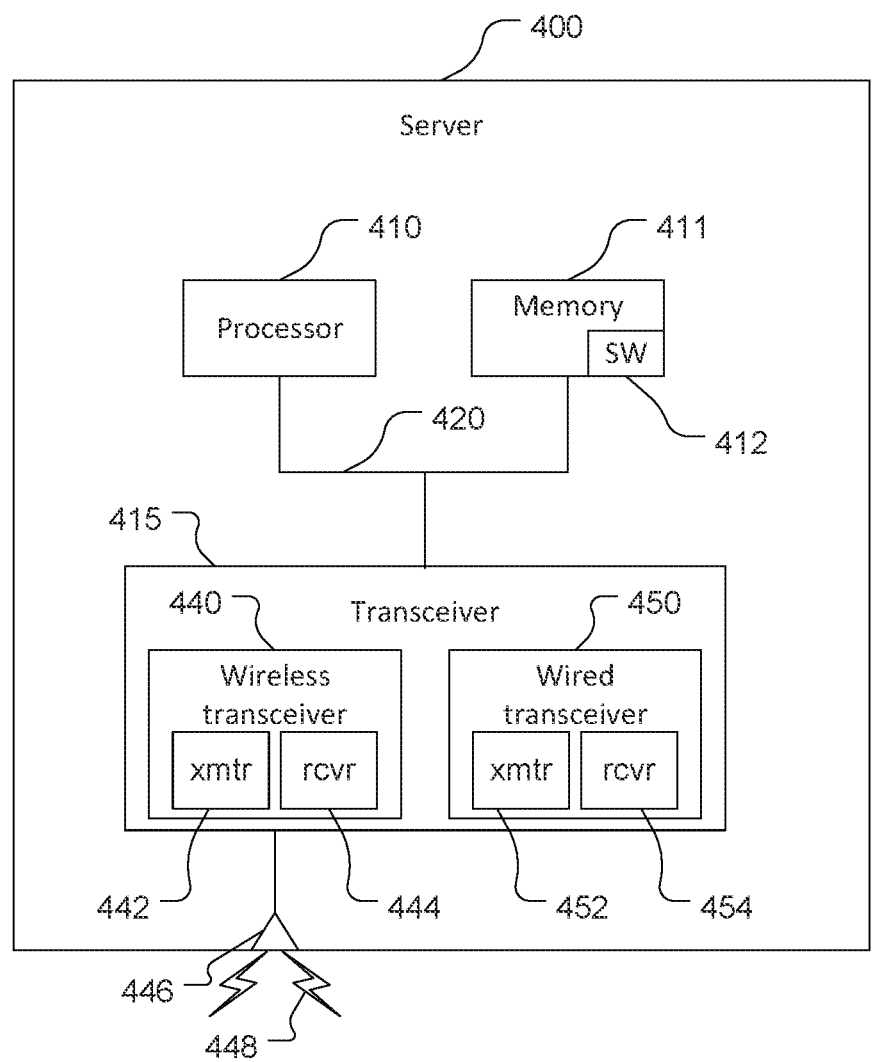
FIG. 4 is a block diagram of components of an example server.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
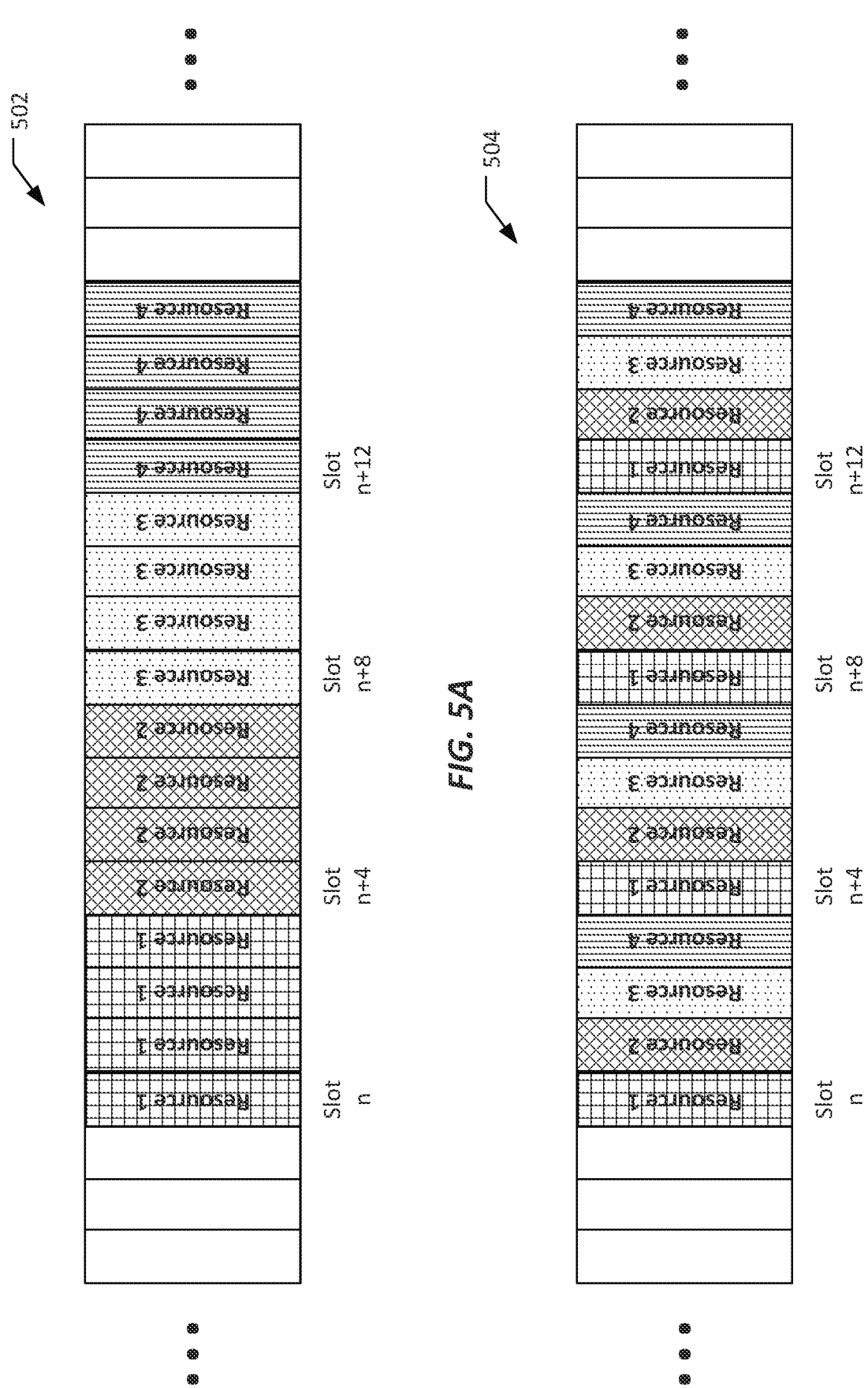
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
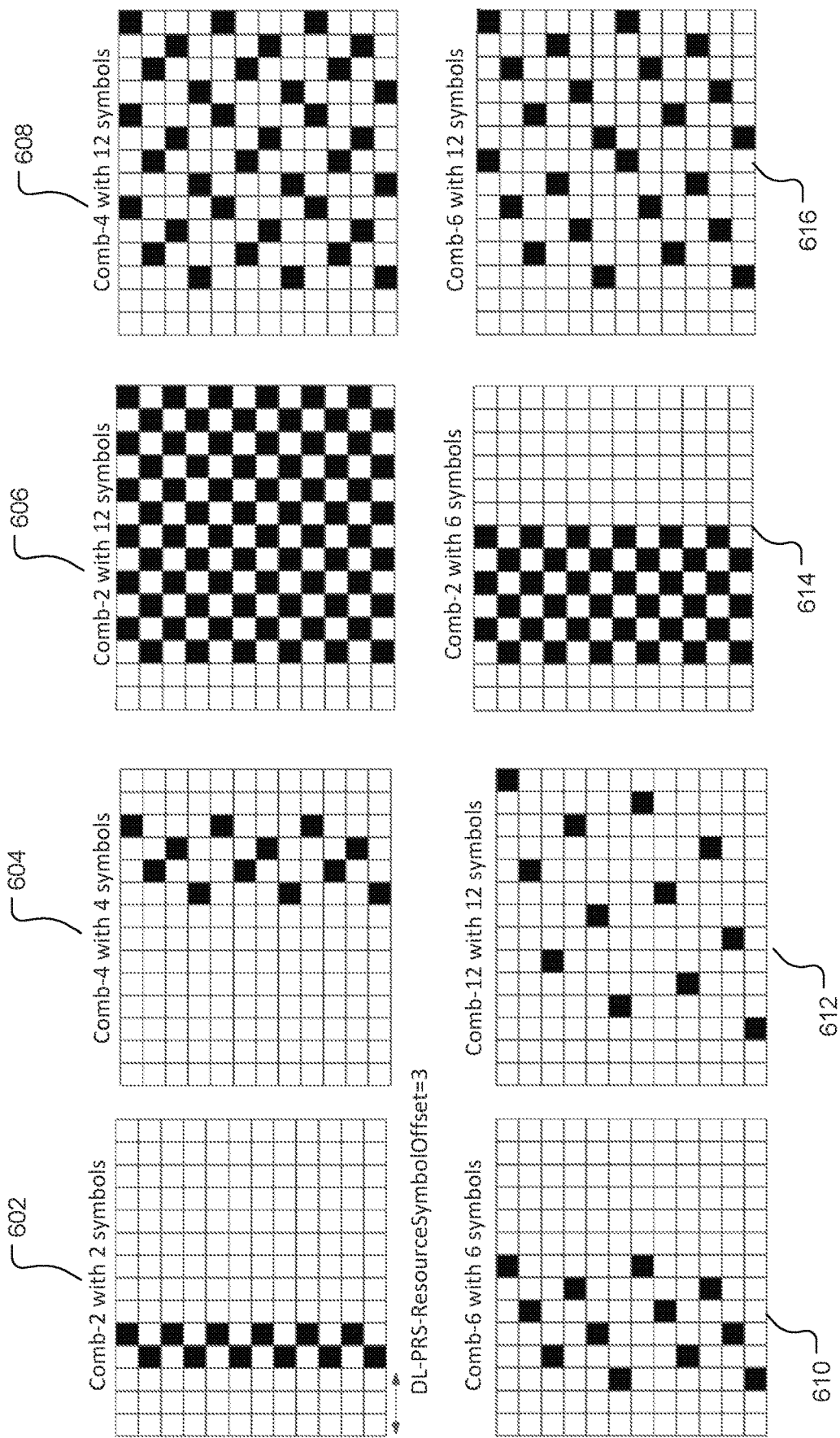
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
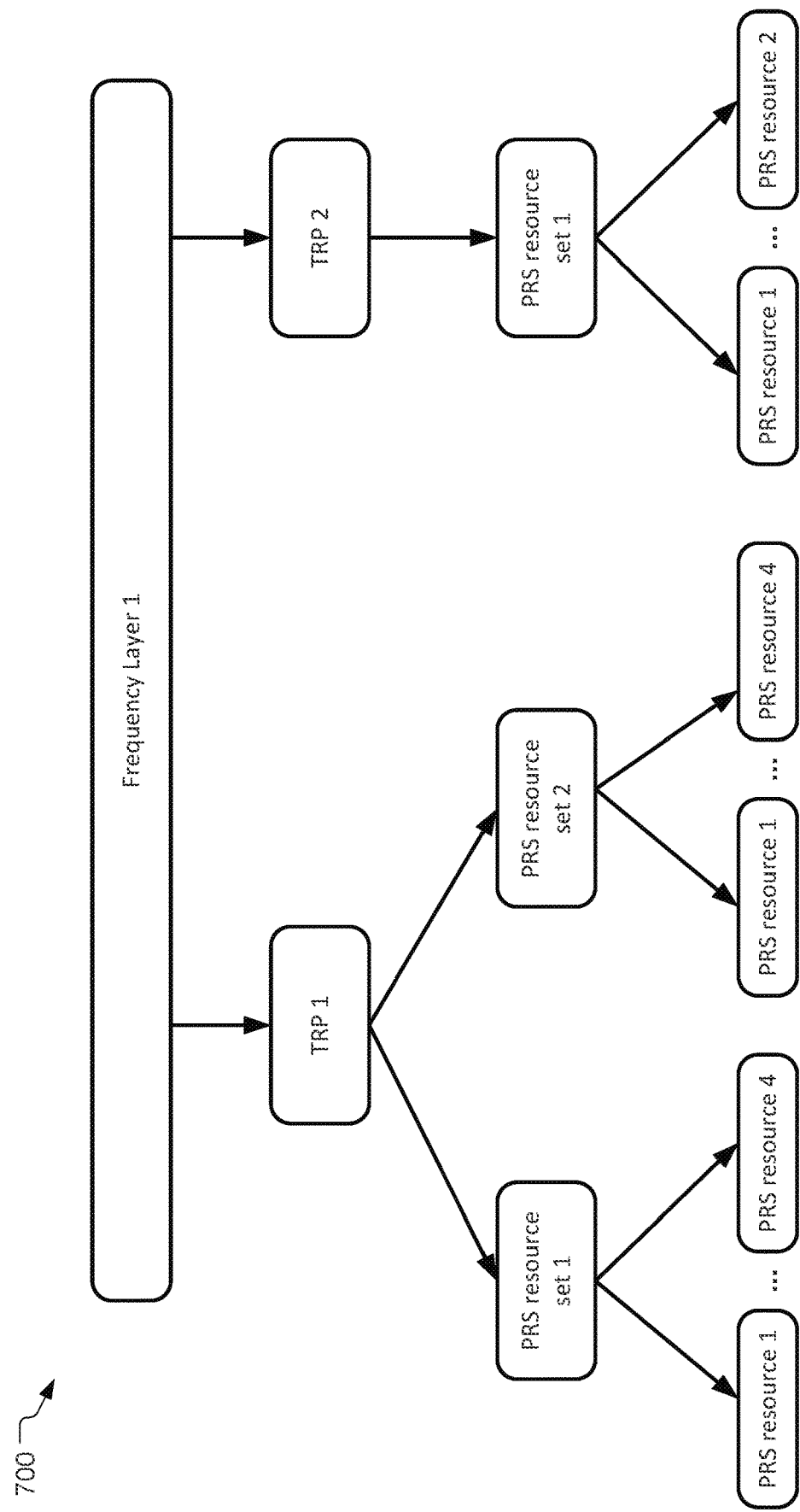
FIG. 7 is a diagram of an example frequency layer.

Referring to FIG. 7, a diagram of an example frequency layer 700 is shown. In an example, the frequency layer 700 also referred to as a positioning frequency layer, may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

Figure 8:
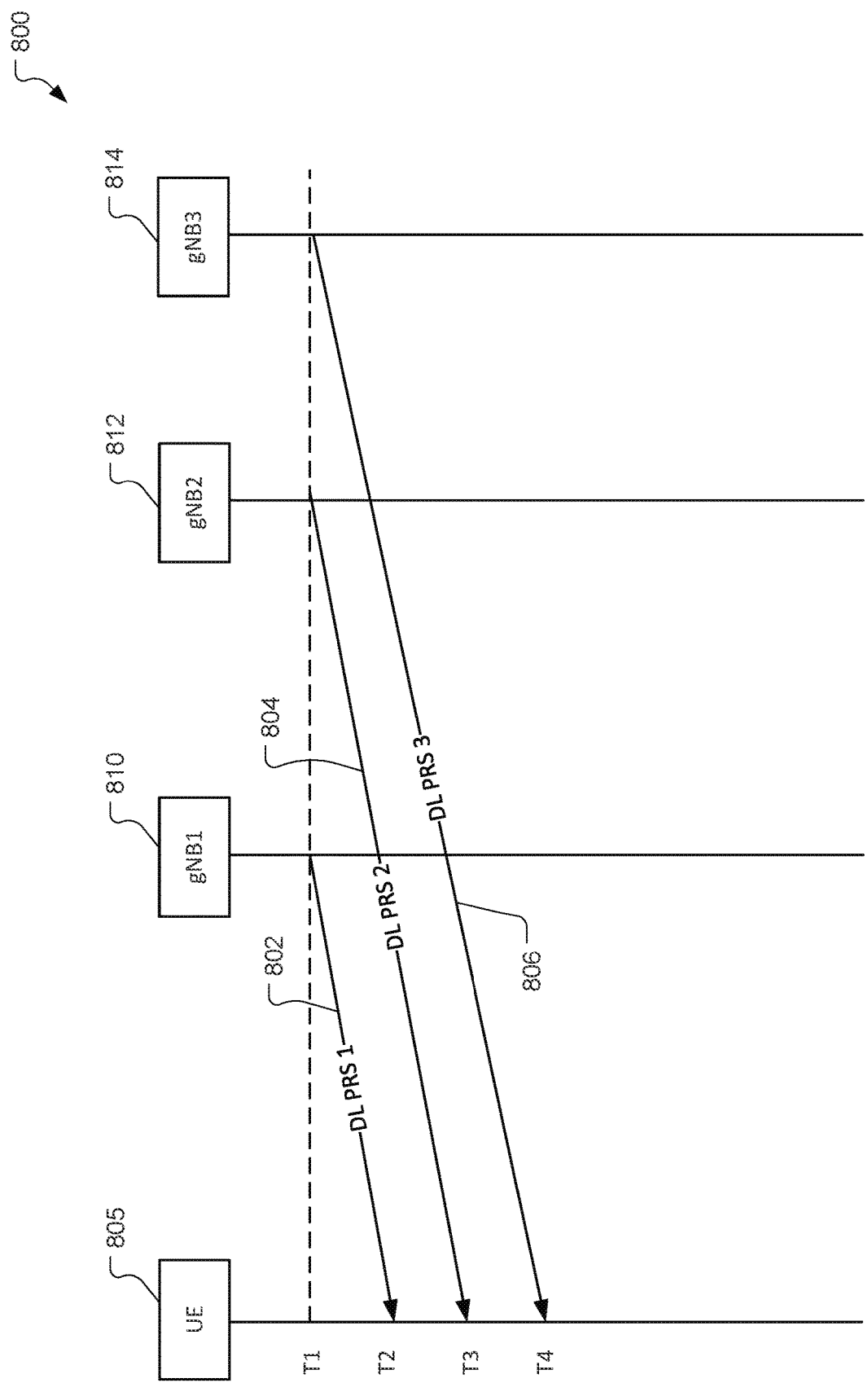
FIG. 8 is an example message flow for a time of arrival based position estimate.

Referring to FIG. 8, an example message flow 800 for time of arrival (ToA) based position flow between a user equipment 805 and a plurality of base stations is shown. The UE 805 is an example of the UE 105, 200 and a first base station 810, a second base station 812 and a third base station 814 are examples of a gNB 110a-b or ng-eNB 114. The number of base stations and message formats in the message flow 800 are examples only and not limitations as other numbers and formats may be used. ToA based positioning methods utilize the precise measurements of the arrival time of signals transmitted from one or more base stations to a user equipment, or vise versa. For example, the first base station 810 may be configured to transmit a first DL PRS 802 at time T1, the second base station 812 may be configured to transmit a second DL PRS 804 at time T1, and the third base station 814 may be configured to transmit a third DL PRS 806 at time T1. The transmit times and signal format are examples only to describe the concepts of ToA lateration techniques. The distance between the UE 805 and the respective base stations 810, 812, 814 is based on the propagation time of the respective PRS signals 802, 804, 806. That is, the signals travel with a known velocity (e.g., approximately the speed of light (c) or ~300 meters per microsecond), and the distance can be determined from the elapsed propagation time. ToA based positioning requires precise knowledge of the transmission start time(s), and that all stations are accurately synchronized with a precise time source. Using the propagation speed and measured time, a distance (D) between the UE 805 and respective base station may be expressed as:

$$D = c * (t) \tag{1}$$

where:

$D$ = distance (meters);

$c$ = propagation speed of ~300 meters/microsecond;

$t$ = time in microseconds.

For example, the distance between the UE 805 and the first base station 810 is c*(T2−T1), the distance between the UE 805 and the second base station 812 is c*(T3−T1), and the distance between the UE 805 and the third base station 814 is c*(T4−T1). The stations may use other transmission times (i.e., not all stations must transmit at time T1). Using the respective distances as a radius, a circular representation of the area around the base stations may be used to determine a position estimate for the UE 805 (e.g., using trilateration). Additional stations may be used (e.g., using multilateration techniques). ToA positioning methods may be used for two-dimensional as well as three-dimensional position estimates. Three-dimensional resolution can be performed by constructing spherical instead of circular models.

A drawback of ToA positioning methods is the requirement for precise time synchronization of all stations. Even small issues with time synchronization may result in very large errors in the resulting positioning estimates. For example, a time measurement error as small as 100 nanoseconds can result in a localization error of 30 meters. ToA-based positioning solutions are particularly susceptible to outages in station timing sources which may cause a base station to lose time synchronization. Other positioning techniques, such as round trip timing (RTT) and Angle of Arrival (AoA) are less dependent on station time synchronization.

Figure 9:
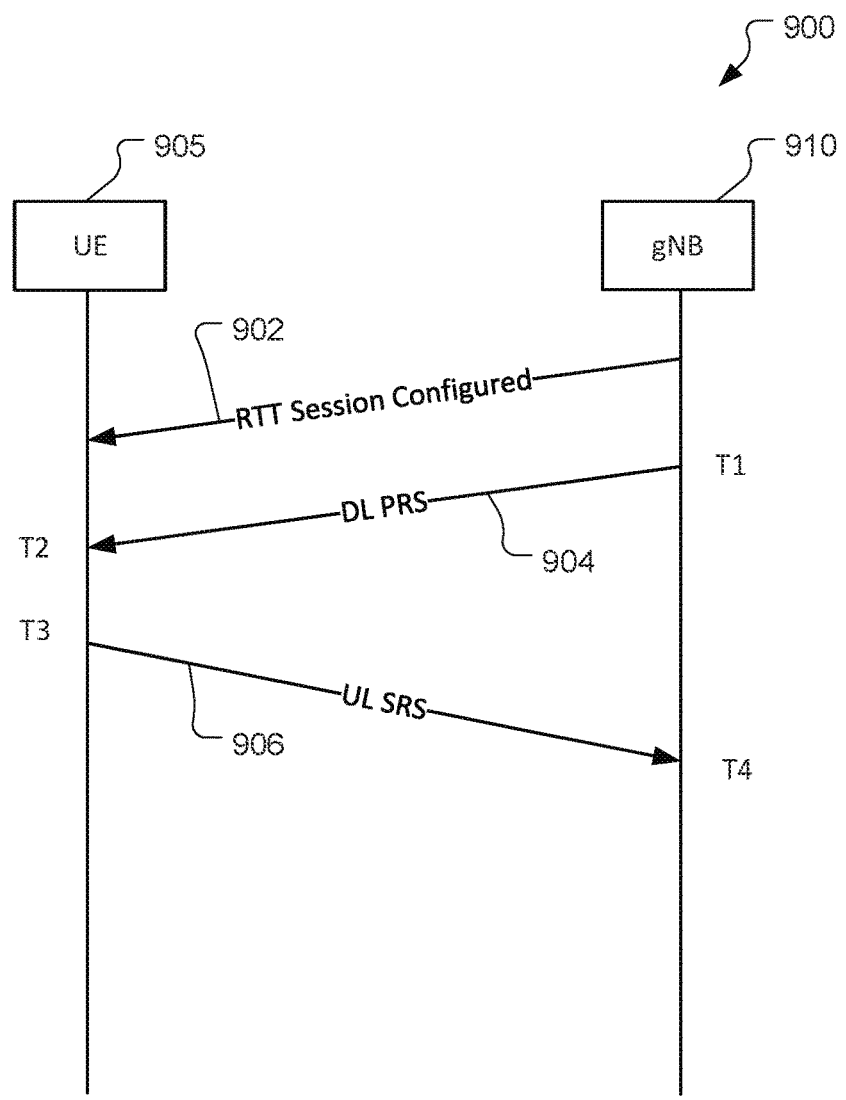
FIG. 9 is an example round trip time message flow between a user equipment and a base station.

Referring to FIG. 9, an example round trip message flow 900 between a user equipment 905 and a base station 910 is shown. The UE 905 is an example of the UE 105, 200 and the base station 910 may be a gNB 110a-b or ng-eNB 114. In general, RTT positioning methods utilize a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. The example message flow 900 may be initiated by the base station 910 with a RTT session configured message 902. The base station may utilize the LPP/NRPPa messaging to configure the RTT session. At time T1, the base station 910 may transmit a DL PRS 904, which is received by the UE 905 at time T2. In response, the UE 905 may transmit a Sounding Reference Signal (SRS) for positioning message 906 at time T3 which is received by the base station 910 at time T4. The distance between the UE 905 and the base station 910 may be computed as:

$$\text{distance} = \frac{c}{2}((T4 - T1) - (T3 - T2)) \quad (2)$$

where $c$ = speed of light.

Since the UE 905 and base station 910 are exchanging messages, which may include timing information, the impact of a timing offset between the stations may be minimized. That is, the RTT procedures may be used in asynchronous networks. A drawback to RTT procedures, however, is that in dense operating environments, where there are many UEs exchanging RTT messages with base stations, the bandwidth required for the UL SRS for positioning messages may increase the messaging overhead and utilize excess network bandwidth. In this use case, passive positioning techniques may reduce the bandwidth required for positioning by eliminating transmissions from the UE.

Figure 10:
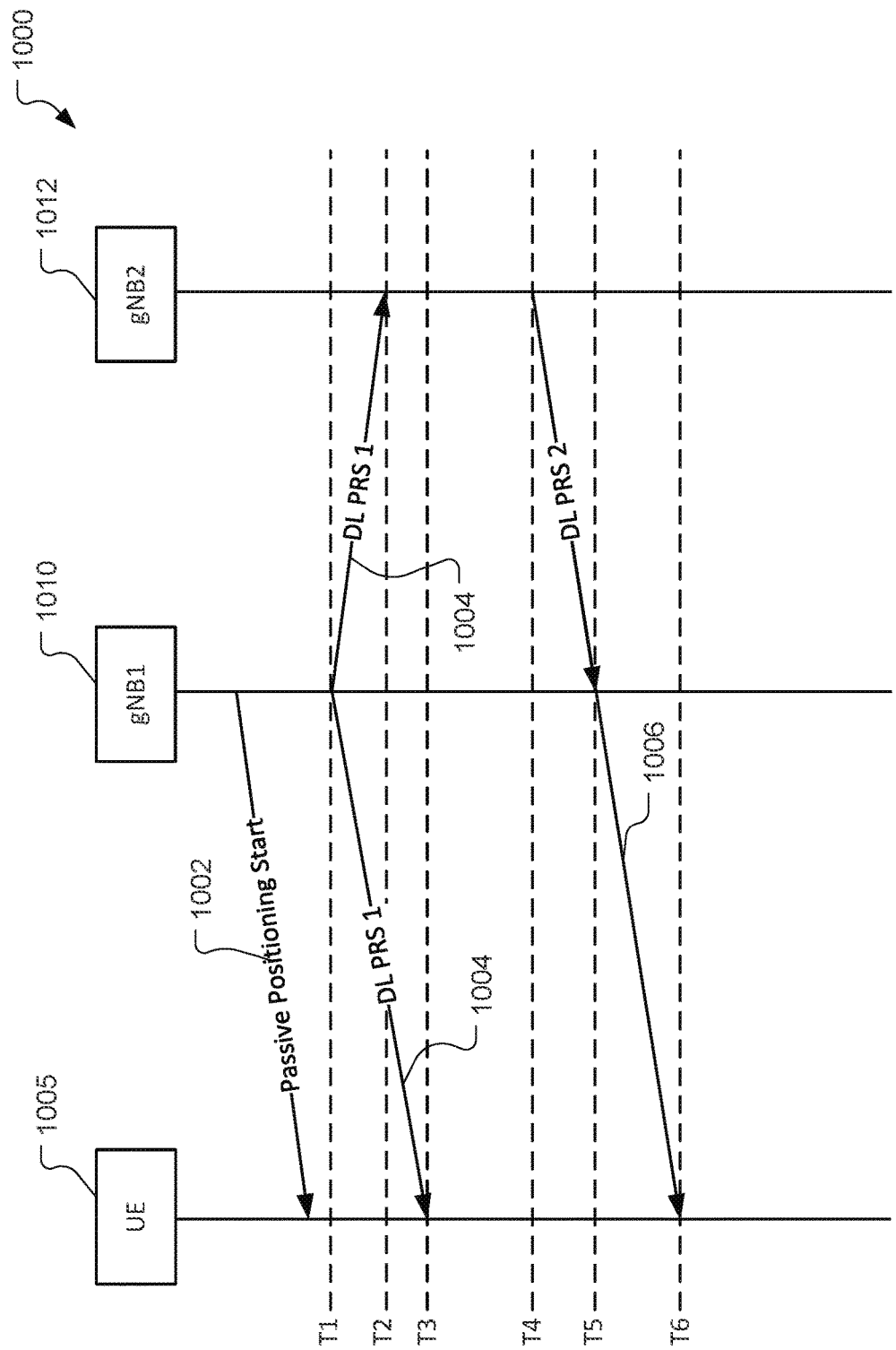
FIG. 10 is an example message flow for passive positioning of a user equipment.

Referring to FIG. 10, an example message flow 1000 for passive positioning of a user equipment 1005 is shown. The message flow includes the UE 1005, a first base station 1010 and a second base station 1012. The UE 1005 is an example of the UEs 105, 200, and the base stations 1010, 1012 are examples of the gNBs 110*a-b* or ng-eNB 114. In general, TDOA positioning techniques utilize the difference in travel times between one entity and other entities to determine relative ranges from the other entities and those, combined with known locations of the other entities, may be used to determine the location of the one entity. Angles of arrival and/or departure may be used to help determine a location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). In operation, the first base station 1010 may provide a passive positioning start message 1002 to the UE 1005. The passive positioning start message 1002 may be a broadcast message, or other signaling such as RRC, to inform the UE of a PRS transmission schedule and may include transmission information (e.g., channel information, muting patterns, PRS bandwidth, PRS identification information, etc.). At time T1, the first station may transmit a first DL PRS 1004 which may be received by the second base station 1012 at time T2 (for example), and by the UE 1005 at time T3. The second base station 1012 may be configured to transmit a second DL PRS 1006 at time T4, which is received by the first base station 1010 at time T5 and by the UE 1005 at time T6. The time between T2 and T4 may be a configured turnaround time on the second base station 1012 and thus a known period of time. The time between T1 and T2 (i.e., time of flight) may also be known because the first and second base stations 1010, 1012 are in fixed locations. The turnaround time (i.e., T4−T2) and the time of flight (i.e., T2−T1) may be broadcast or otherwise provided to the UE 1005 for use in positioning calculations. The UE 1005 may observe the difference between T6 and T3, and the distances may be computed as:

$$D_{gNB1-UE} = \frac{c}{2}((T_3 - T_1)) \quad (3)$$

$$D_{gNB2-UE} = \frac{c}{2}((T_6 - T_1) - (T_4 - T_2) - (T_2 - T_1)) = \frac{c}{2}(T_6 - T_4) \quad (4)$$

$$D_{gNB2-UE} - D_{gNB1-UE} = \frac{c}{2}((T_6 - T_3) - (T_4 - T_2) - (T_2 - T_1)) \quad (5)$$

In operation, in an example, the base stations 1010, 1012 may utilize synchronized timing to compute the time of flight values. In an example, the first DL PRS 1004 and the second DL PRS 1006 may include timing information (such as in the RTT message flow 900) and thus may reduce the impact of a timing offset between the stations.

Figure 11:
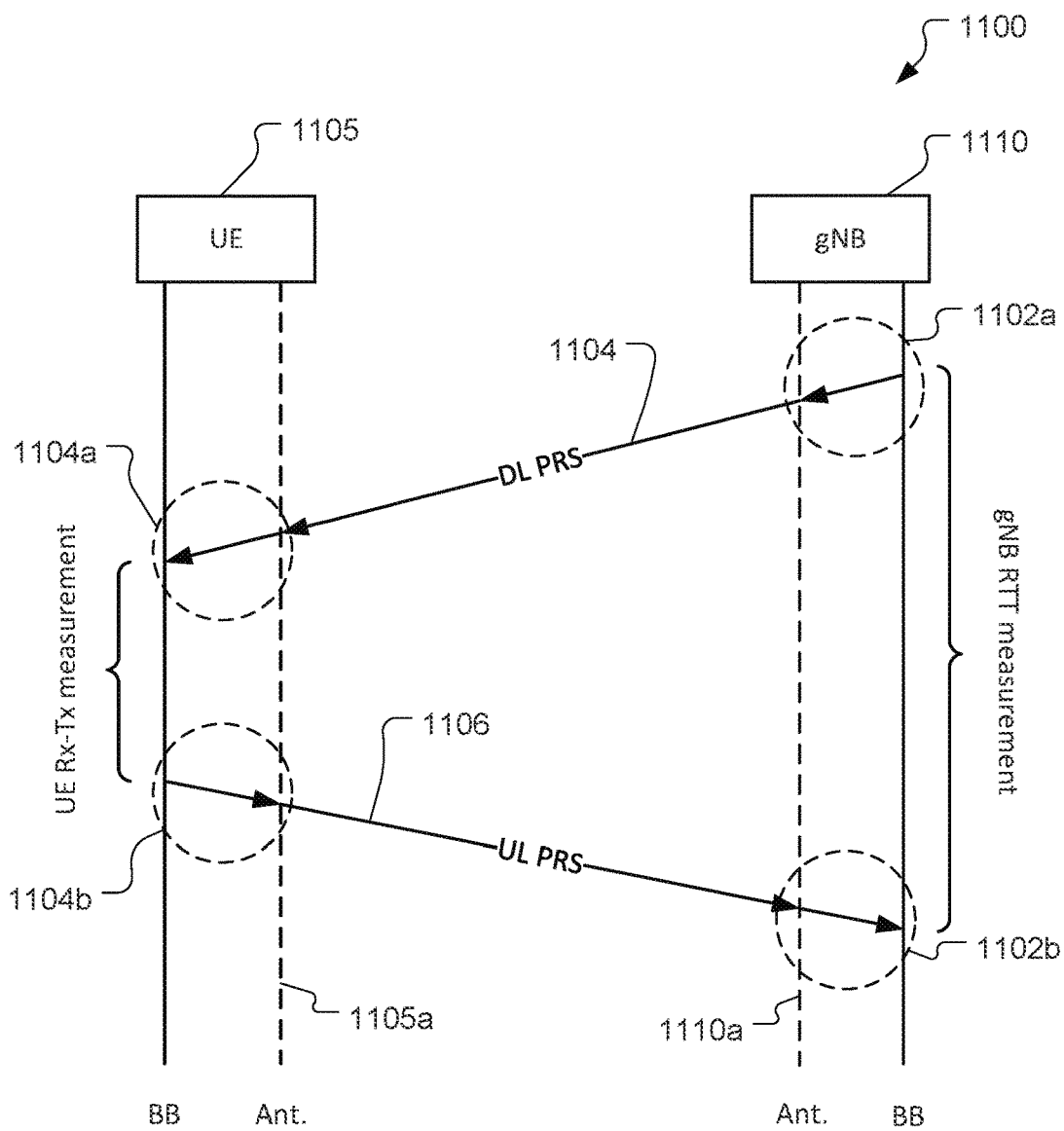
FIG. 11 is a diagram of example impacts of group delay errors in wireless transceivers.

Referring to FIG. 11, a diagram 1100 of example impacts of group delay errors within wireless transceivers are shown. The diagram 1100 depicts an example RTT exchange such as described in FIG. 9. A UE 1105, such as the UE 200, and a base station 1110, such as the gNB 110*a*, are exchanging positioning reference signals such as a downlink (DL) PRS 1104 and an uplink (UL) PRS 1106 (which may also be an UL SRS). The UE 1105 may have one or more antennas 1105*a* and associated base band processing components. Similarly, the base station 1110 may have one or more antennas 1110*a* and base band processing components. The respective internal configurations of the UE 1105 and the base station 1110 may cause delay times associated with the transmission and reception of PRS signals. In general, a group delay is a transit time of a signal through a device versus frequency. For example, a $BS_{TX}$ group delay 1102*a* represents the difference in time the base station 1110 records the transmission of the DL PRS 1104 and the time the signal leaves the antenna 1110*a*. A $BS_{RX}$ group delay 1102*b* represents the difference in time the UL PRS 1106 arrives at the antenna 1110*a* and the time the processors in the base station 1110 receive an indication of the UL PRS 1106. The UE 1105 has similar group delays such as the $UE_{RX}$ group delay 1104*a* and the $UE_{TX}$ group delay 1104*b*. The group delays associated with the network stations may create a bottleneck for terrestrial based positioning because the resulting time differences lead to inaccurate position estimates. For example, a 10 nanosecond group delay error equates to approximately a 3 meter error in the position estimate. Different frequencies may have different group delay values in a transceiver, thus different PRS resources may have different group delays. The double difference positioning methods described herein may reduce the impact of the group delays associated with network stations through the use of one or more reference nodes configured to determine the errors associated with PRS resources transmitted by network stations.

Figure 12:
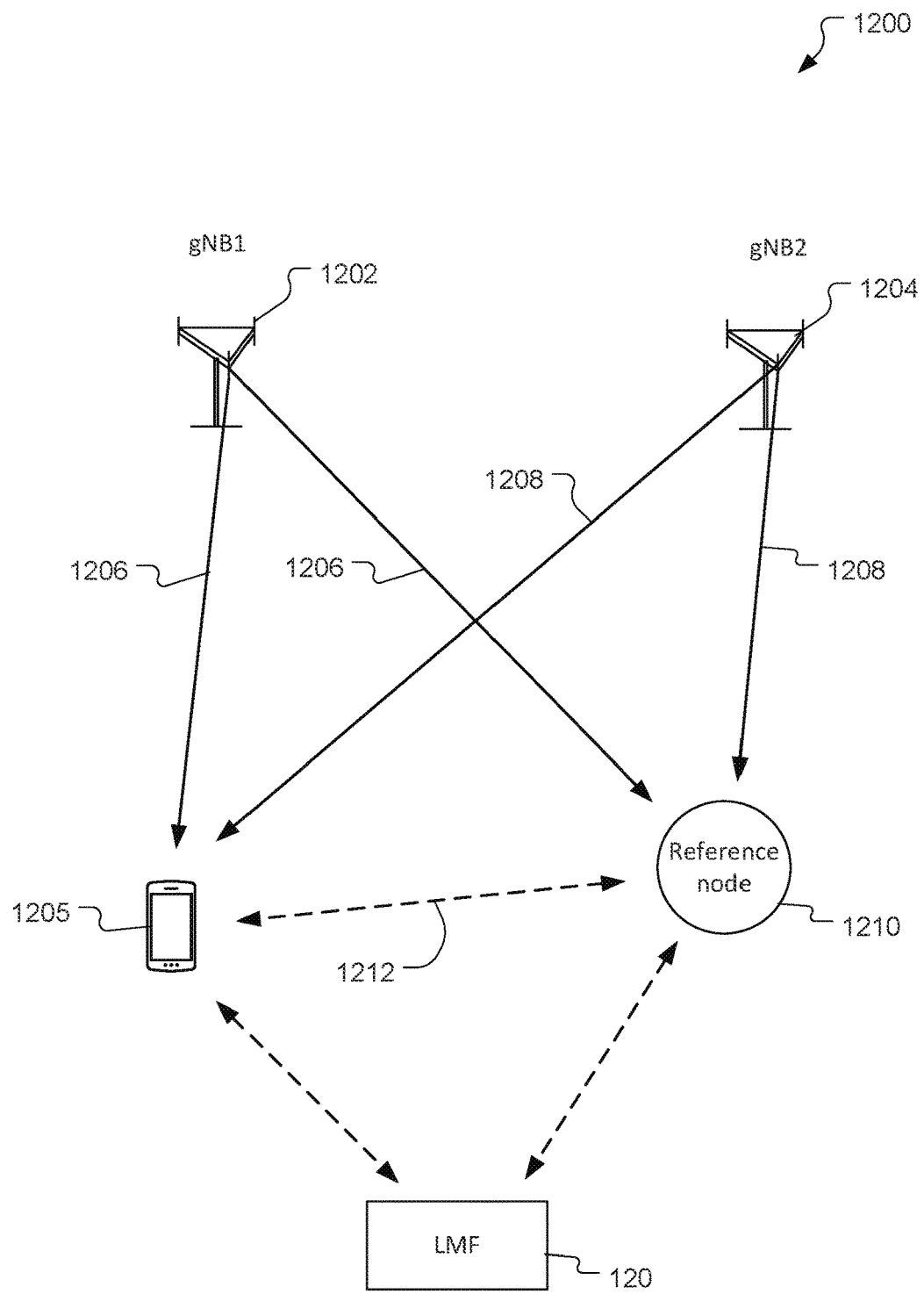
FIG. 12 is a diagram of an example double difference positioning method.

Referring to FIG. 12, a diagram 1200 of an example double difference positioning method is shown. The diagram 1200 includes a first base station 1202, a second base station 1204, a target UE 1205, and a reference node 1210. The base stations 1202, 1204 may be considered examples of the TRP 300, such as the gNBs 110*a*, 110*b*. The target UE 1205 may include at least some of the components of the UE 200 and may be considered an example of the UE 200. The reference node 1210 may include components of the UE 200 and/or the TRP 300 and may be an example of either a UE 200 or a TRP 300, or another device configured to communicate in the communication system 100. For example, the target UE 1205 and the reference node 1210 may be configured to communicate with a network entity such as the LMF 120 via one or more communication protocols. (e.g., via NRPPa, LPP, etc.). In an example, the target UE 1205 and the reference node 1210 may be configured to communicate via device-to-device (D2D) link 1212. The D2D link 1212 may be based on technologies such as NR sidelink (e.g., via the physical sidelink control channel (PSCCH), physical sidelink shared channel (PSSCH)). In a vehicle-to-everything (V2X) network, the reference node 1210 may be a roadside unit (RSU), and the sidelink may be based on the PC5 protocol. Other D2D technologies may also be used.

In operation, the first base station 1202 is configured to transmit PRS resources such as a first PRS 1206 which is received by both the target UE 1205 and the reference node 1210. Preferably, the same instance of the first PRS 1206 received by the UE 1205 and reference node 1210, but different instances of the first PRS 1206 may be received by the UE 1205 and the reference node 1210. The second base station 1204 is configured to transmit PRS resources such as one or more instances of a second PRS 1208 which is received by both the target UE 1205 and the reference node 1210. The first and second PRS 1206, 1208 may be in the same or different positioning frequency layers. Since the reference node 1210 is in a known location, the expected time of arrivals (ToAs), the reference signal timing difference (RSTD), and/or round trip times (RTT) for the first and second PRSs 1206, 1208 are known based on the propagation time of the RF signals. A delay in the actual measurements as compared to the expected ToAs may be used to determine the group delay associated with the PRSs 1206, 1208. This computed delay value may be used to compensate measurements of the PRSs 1206, 1208 for proximate mobile devices, such as the target UE 1205. In an example, the reference node 1210 may provide the compensation values associated with the first and second PRS 1206, 1208 to the LMF 120, and the target UE 1205 may obtain the compensation values from the LMF 120. In an example, the reference node 1210 may provide the compensation values via the D2D link 1212. In an example, the reference node 1210 may be a UE 200 at a known location.

In an ideal installation, the reference node 1210 will have a fixed and accurate location, and will be in a position to receive all PRS being transmitted by the network stations and received by the UEs in the network. In practice, however, these conditions may not be satisfied. Variations may include, for example, the reality that a single reference node 1210 may not be able to measure all transmitted PRS. For example, due to scheduling conflicts, power consumption limitations, signal obstructions, frequency and bandwidth capabilities, etc. In another example, the reference node 1210 and the target UE 1205 may not be in positions to measure the same instance of PRSs transmitted by the base stations. The location of the reference node 1210 may change without a corresponding change to the ToA model (e.g., the ToA information may become outdated when a reference node moves). These issues are examples only, and not limitations, as other operational variations may impact the accuracy of the compensation values provided by a reference node.

Figure 13:
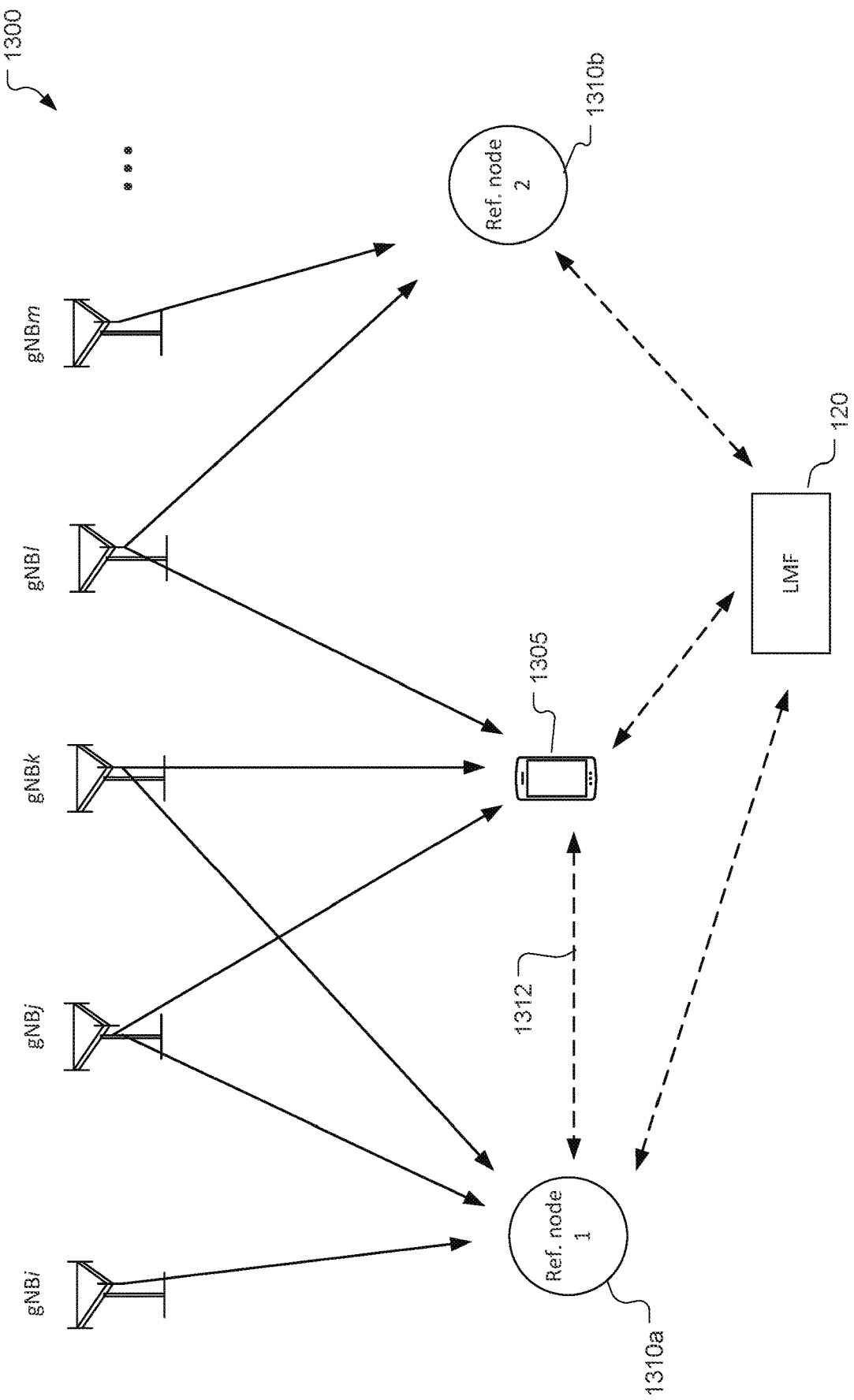
FIG. 13 is a diagram of reference node selection in an example wireless network.

Referring to FIG. 13, with further reference to FIG. 12, a diagram 1300 of reference node selection in an example wireless network is shown. The network includes a plurality of base stations gNBi-m, each of which may be an example of a TRP 300, a first reference node 1310*a*, a second reference node 1310*b*, and a target UE 1305. The first reference node 1310*a* is in a location to receive PRSs from a first set of the plurality of base stations, the first set including gNBi, gNBj and gNBk, and the second reference node 1310*b* is in a location to receive PRSs from a second set of the plurality of base stations, the second set including gNBl and gNBm. The target UE 1305 is currently located in a position to receive PRSs from a third set of the base stations, the third set including gNBj, gNBk and gNBj. The number of stations, locations of the reference nodes and received PRS are examples only, and not limitations as other network stations and PRS may be used. The plurality of base stations gNBi-m, the reference nodes 1310*a*-*b*, and the target UE 1305 may be configured to communicate with one or more location servers such as the LMF 120. In an example, the LMF 120, or another network server, may be configured to select one or more reference nodes to provide PRS compensation information to the target UE 1305. The reference nodes 1310*a*-*b* may be combinations of any wireless nodes such as base stations (e.g., a gNB), UEs, IAB relays, etc., each of which is configured to support the double difference positioning method depicted in FIG. 12. The LMF 120 may be configured to request capability reports from potential reference nodes 1310*a*-*b* and the target UE 1305 to confirm that the reference nodes 1310*a*-*b* and the target UE 1305 are configured to generate and implement compensation information.

In an embodiment, the LMF 120 may be configured to utilize different criteria for selecting the reference nodes 1310*a*-*b* within a region covered by PRS resources. In an example, the reference nodes 1310*a*-*b* may be selected based on their ability to cover a maximum amount of PRS resources. The coverage may be interpreted as the PRS resource which may be measured, reported, or identified based on measurements obtained by the reference nodes 1310*a*-*b*. Filtering (e.g., outlier removal) and other channel estimation/path loss techniques may be used to determine the LOS measurements. The reference nodes 1310*a*-*b* may be selected based on the number of overlapped PRS measurements in an effort to increase the number of RSTD-based compensation values generated. The PRS measurements obtained by the target UE 1305 may be partially overlapped with two or more reference nodes. For example, the target UE 1305 and the first reference node 1310*a* are located to receive PRS from gNBj and gNBk, and the target UE 1305 and the second reference node 1310*b* are configured to receive PRS from gNBl. The PRS resources/TRPs with the overlapped PRS measurements may be used to select a RSTD reference cell. In an example, the reference nodes 1310*a*-*b* may be selected based on a motion type. In general, a static node may be preferred since it has a relatively static environment with a more accurate location. A reference node, however, may also be mobile and may have a location that is based on other factors such as a movement history. Satellite and terrestrial positioning techniques may also be used to determine the location of a reference node. For example, GNSS precise point positioning (PPP), real time kinematic (RTK), and/or differential GNSS (DGNSS) techniques may be used to determine a location of the reference nodes 1310*a*-*b*.

In an embodiment, a reference node may be selected based on a sidelink communication channel between a reference node and the UE. For example, the first reference node 1310*a* and the target UE 1305 are proximate to one another and configured to utilize a D2D link 1312 to communicate. The first reference node 1310*a* may be configured to provide ToA and RSTD compensation information associated with PRS resources transmitted from gNBi, gNBj and gNBk to the target UE 1305 via the D2D link 1312. The target UE 1305 may receive compensation information from other reference nodes via other sidelinks and network channels. For example, the second reference node

1310b may provide compensation information associated with PRS transmitted from gNB1 and gNBm to the LMF 120, and the target UE 1305 may receive the compensation information from the LMF 120.

In general, the compensation information provided by the reference nodes 1310a-b is configured to assist the target UE 1305 to reduce the error associated with the sync errors and group delays of PRS resources transmitted by the base stations. In an example, the compensation information may be the RSTD measurements obtained by a reference node. The location of the reference node(s) may be included in the compensation information and the target UE 1305 or the LMF 120 may be configured to compute time compensation values based on the RSTD measurements and the location information. In an example, a reference node may be configured to compute the time compensation values and provide them in the compensation information. Providing the time compensation values improves security since location information is not transmitted. The compensation information may include the time compensation values on a per PRS resource basis. That is, a time compensation value for each PRS resource received by the reference nodes 1310a-b is computed and provided to the LMF 120 and/or the target UE 1305. Additional information elements, such as channel information, beam angle/elevation, and other beam parameters may also be included in the compensation information.

Figure 14:
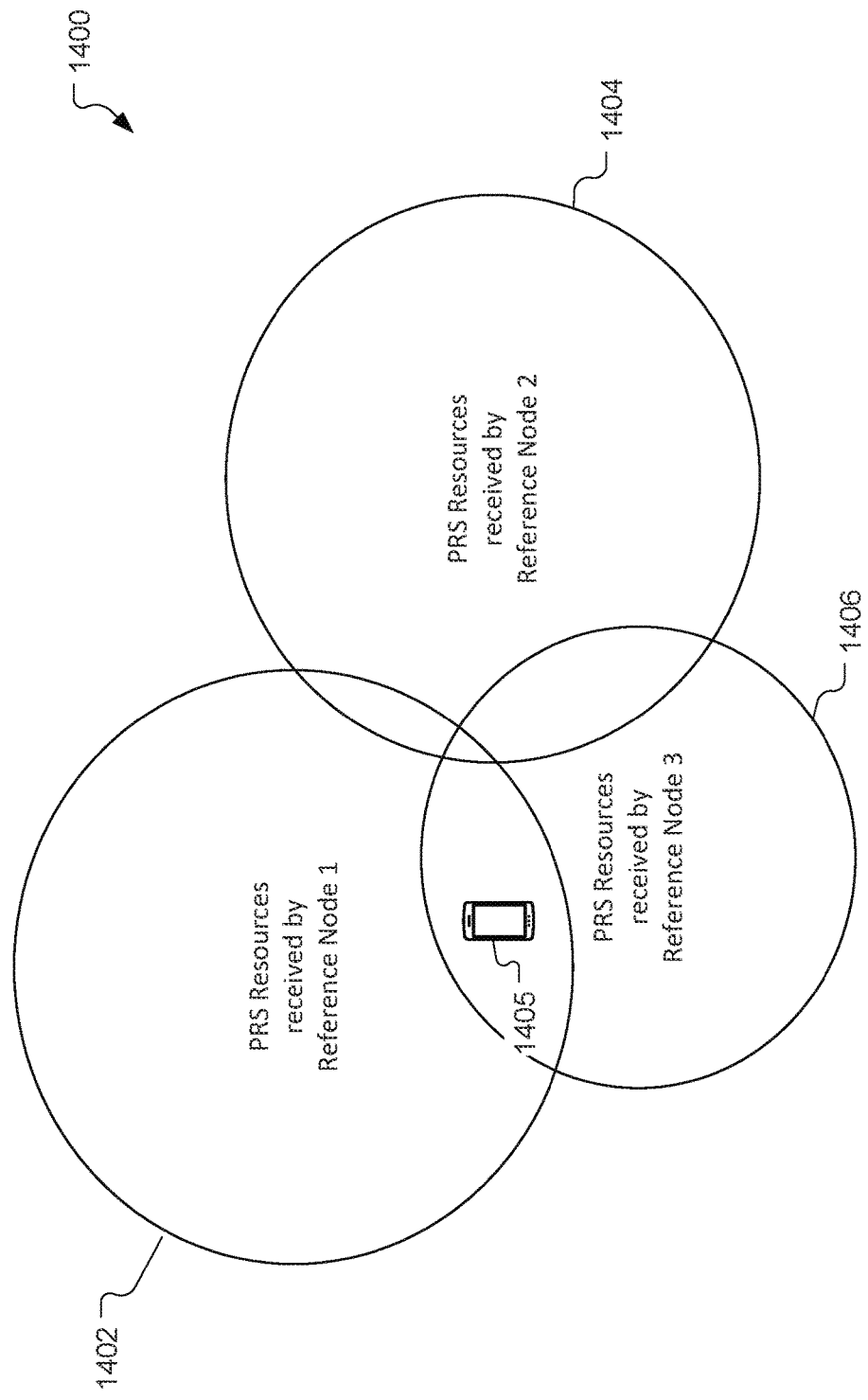
FIG. 14 is a Venn diagram of positioning reference signal resources for reference node selection.

Referring to FIG. 14, a Venn diagram 1400 of positioning reference signal resources for reference node selection is shown. The diagram 1400 represents the PRS resources a UE or reference nodes plan to receive and measure, including a first set of PRS resources 1402 received by a first reference node, a second set of PRS resources 1404 received by a second reference node, and a third set of PRS resources 1406 received by a third reference node. In an example, the LMF 120 may be configured to maintain a data structure indicating the relationships between the PRS resources in a network and the reference nodes, such as depicted in the diagram 1400. The LMF 120 may be configured to select one or more reference nodes based on one or more sets of PRS resources received by the reference nodes. In an example, a target UE 1405 may be camped on a TRP 300 associated with a PRS resource which is received by both the first reference node and the third reference node. In an example, the LMF 120 may select the first reference node to provide compensation information to the target UE 1405 based on the larger number of PRS resources receive by the first reference node as compared to the third reference node. That is, the target UE 1405 may have an increased probability of overlapping PRS resources with the first reference node because there are more PRS resources associated with the first reference node. In an example, the target UE 1405 may provide information associated with received PRS resources (e.g., PRS ID) and the LMF 120 may be configured to select a reference node based on the intersection of the PRS resources received by the target UE 1405 and the PRS resources received by the respective reference nodes. That is, the LMF 120 may select the reference node with the maximum number of PRS resources overlapped with the target UE 1405. In an example, the LMF 120 may configure more than one reference node to provide compensation information to the target UE 1405 (e.g., both the first and third reference nodes may be configured to provide compensation information). In an example, the reference nodes may be configured to provide compensation information on a per PRS resource and/or a per RSTD pair basis. That is, the target UE 1405 may receive only compensation information for PRS resources received by the UE 1405. Other techniques may also be used to select one or more reference nodes to provide compensation information for a target UE.

Figure 15:
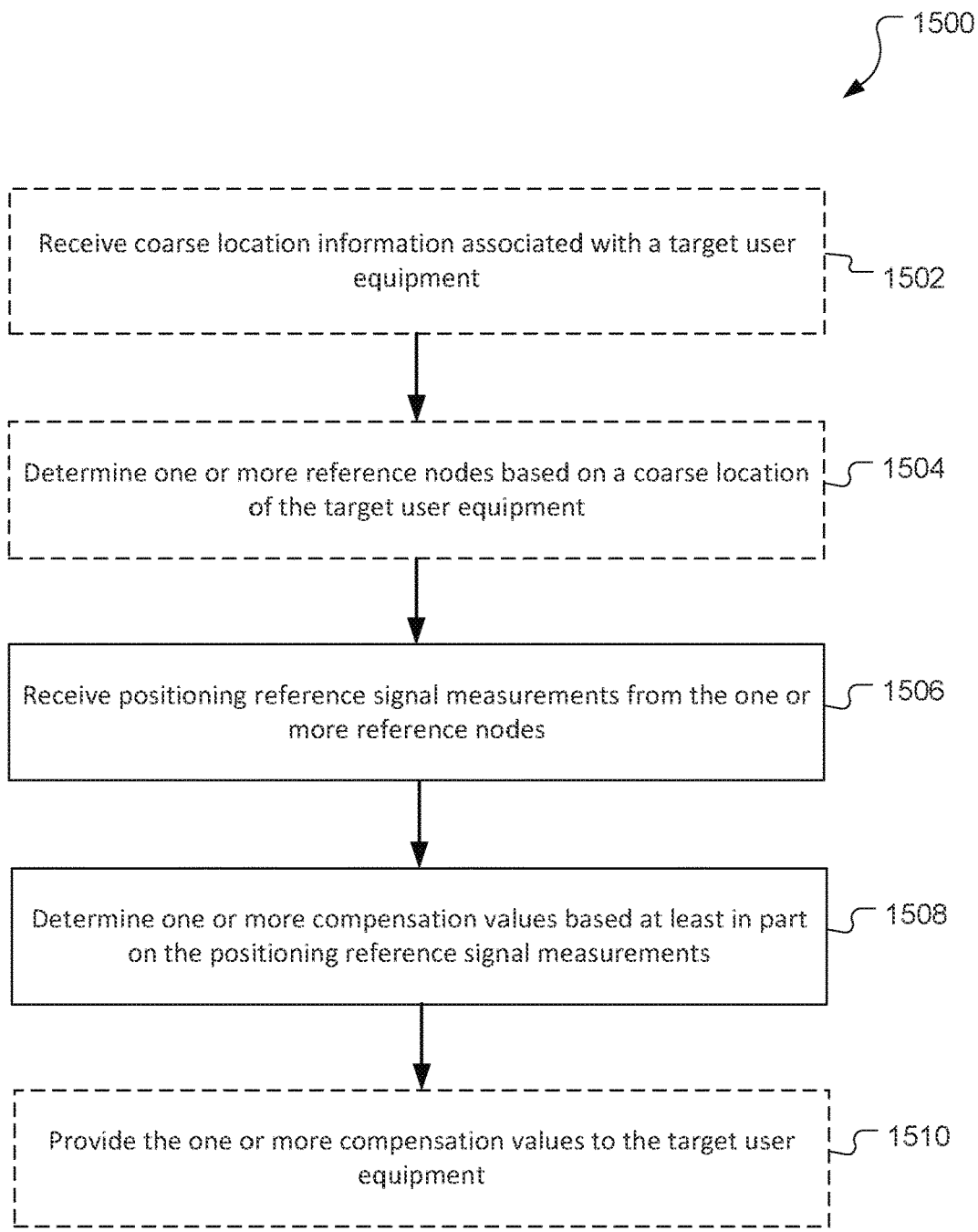
FIG. 15 is a process flow for an example method for providing positioning reference signal compensation values to a target user equipment.

Referring to FIG. 15, with further reference to FIGS. 1-14, a method 1500 for providing positioning reference signal compensation values to a target user equipment includes the stages shown. The method 1500 is, however, an example only and not limiting. The method 1500 may be altered, e.g., by having stages added, removed, rearranged, combined, performed concurrently, and/or having single stages split into multiple stages. For example, receiving coarse location information at stage 1502 and determining one or more reference nodes based on the coarse location are optional as a location server may be configured to determine a location of a target UE, and providing the compensation values to the UE at stage 1510 is optional as a network entity may be configured to apply compensation values locally based on measurements received from the UE. The method 1500 may be performed a server 400, such as the LMF 120, or other network entities such as a TRP 300 or a UE 200.

At stage 1502, the method optionally includes receiving coarse location information associated with a target user equipment. A server 400, such as the LMF 120 including a processor 410 and a transceiver 415, is a means for receiving the coarse location information. In an example, a target UE may be configured to provide identification information of a serving cell to the LMF 120 and the coarse location of the UE may be based on the coverage area of the serving cell. The target UE may be configured to provide identification information with one or more base stations (e.g. BSID) and/or PRS resources (e.g., PRSID) received by the UE and the LMF may determine a coarse location of the UE based on the station and resource identification information. In an example, the UE may include an IMU 270 and the coarse location may be based on inertial navigation measurements (e.g., dead reckoning). The presence of one or more primary and/or sidelink signals (e.g., associated with other network stations at known locations) may also be used to determine the coarse location of the UE. Other terrestrial and satellite navigation techniques may also be used to determine the coarse location of the UE.

At stage 1504, the method optionally includes determining one or more reference nodes based on the coarse location of the target user equipment. The LMF 120 is a means for determining the one or more reference nodes. In an example, the LMF 120 may be configured with one or more data structures including coverage areas associated with PRS resources transmitted by network base stations. The PRS resources may be associated with one or more reference nodes which are in a position and configured to receive the PRS resources. For example, referring to FIG. 14 the coarse location of the UE may be used to determine a set of PRS resources the UE may be expected to receive. The set of PRS resources may be compared to PRS resources received by the respective reference nodes. The one or more reference nodes may be selected such that there may be an overlap between the PRS resources the UE and the reference nodes are expected to receive. In an example, the LMF 120 may be configured to select reference nodes which have a detectable LOS path to the base stations the UE is expected to receive PRS resource transmissions from. The LMF 120 may provide one or more messages to the network stations (base stations, reference nodes and UEs) to enable the transmission and reception of PRS resources. For example, the LMF 120 may provide PRS resource information to the UE based on the selection of the one or more reference nodes to ensure the UE is configured to receive the same PRS as the reference node(s).

At stage 1506, the method includes receiving positioning reference signal measurements from the one or more reference nodes. The LMF 120 is a means for receiving the PRS measurements. In an example, the one or more reference nodes may provide ToA, RSTD, and/or RTT measurements for specific PRS resources and resource pairs, as well as location information, to the LMF 120. The PRS measurements may include PRS identification information elements to identify the PRS the measurement is based upon. In an example, the reference nodes may be configured to determine the ToA, RSTD, and/or RTT time compensation values for the PRS resources and provide the time compensation values as the PRS signal measurements. The PRS measurement information may be received via messaging protocols such as NRPPa, LPP, Radio Resource Control (RRC), or other wireless protocols used in communication networks.

At stage 1508, the method includes determining one or more compensation values based at least in part on the positioning reference signal measurements. The LMF 120 is a means for determining the compensation values. The LMF 120 may receive ToA, RSTD, and/or RTT measurement information from the reference nodes and may be configured to determine time compensation values based on the measurement information and the locations of the reference nodes. In an example, the reference nodes may be configured to provide location information (e.g., based on PPP, RTK, etc.) with the PRS measurement information. The LMF 120 may determine the compensation values by receiving the compensation values from the reference nodes. That is, the reference nodes may be configured to determine the one or more compensation values and provide them to the LMF 120. The LMF 120 may be configured to utilize the PRS information associated with the compensation values and the PRS measurement information received from the target UE to select one or more compensation values to provide to the UE.

At stage 1510, the method optionally includes providing the one or more compensation values to the target user equipment. The LMF 120 is a means for providing the one or more compensation values. In an example, the compensation values are time values associated with a PRS resource (e.g., for a ToA measurement), or a pair of PRS resources (e.g., for RSTD measurements). The LMF 120 may be configured to provide the compensation values based on the PRS resources received by the target UE. The LMF 120 may be configured to provide compensation values based on the PRS resources the UE is expected to receive, and the UE may be configured to utilize the compensation values based on the PRS resources actually received. In an example, the LMF 120 may receive the PRS measurements obtained by the UE and may apply the compensation values to the measurements. The LMF 120 may be configured to determine the location of the UE based on the PRS measurements provided by the UE and the compensation values associated with the reference nodes. In an embodiment, the UE may receive the compensation values from the LMF 120, and compute a location based on the PRS measurements and the compensation values. Other network entities may also be configured to assist the UE in determining a location based on the PRS measurements obtained by the UE and the compensation values associated with the reference nodes.

The method 1500 may be performed on a network server, such at the LMF 120, or other network entities such as the TRP 300 and a UE 200. In an example, the TRP 300 may be configured to receive the PRS measurements at stage 1506, determine the one or more compensation values at stage 1508, and provide the one or more compensation values to a target user equipment. In an example, a UE 200 may be in a known location and may exchange sidelink positioning reference signals (SL-PRS) with one or more reference nodes, then receive the SL-PRS measurement at stage 1506, and determine the one or more compensation values based on the SL-PRS measurements at stage 1508. The UE 200 may also be configured to provide the one or more compensation values to neighboring stations via sidelink signaling.

Figure 16:
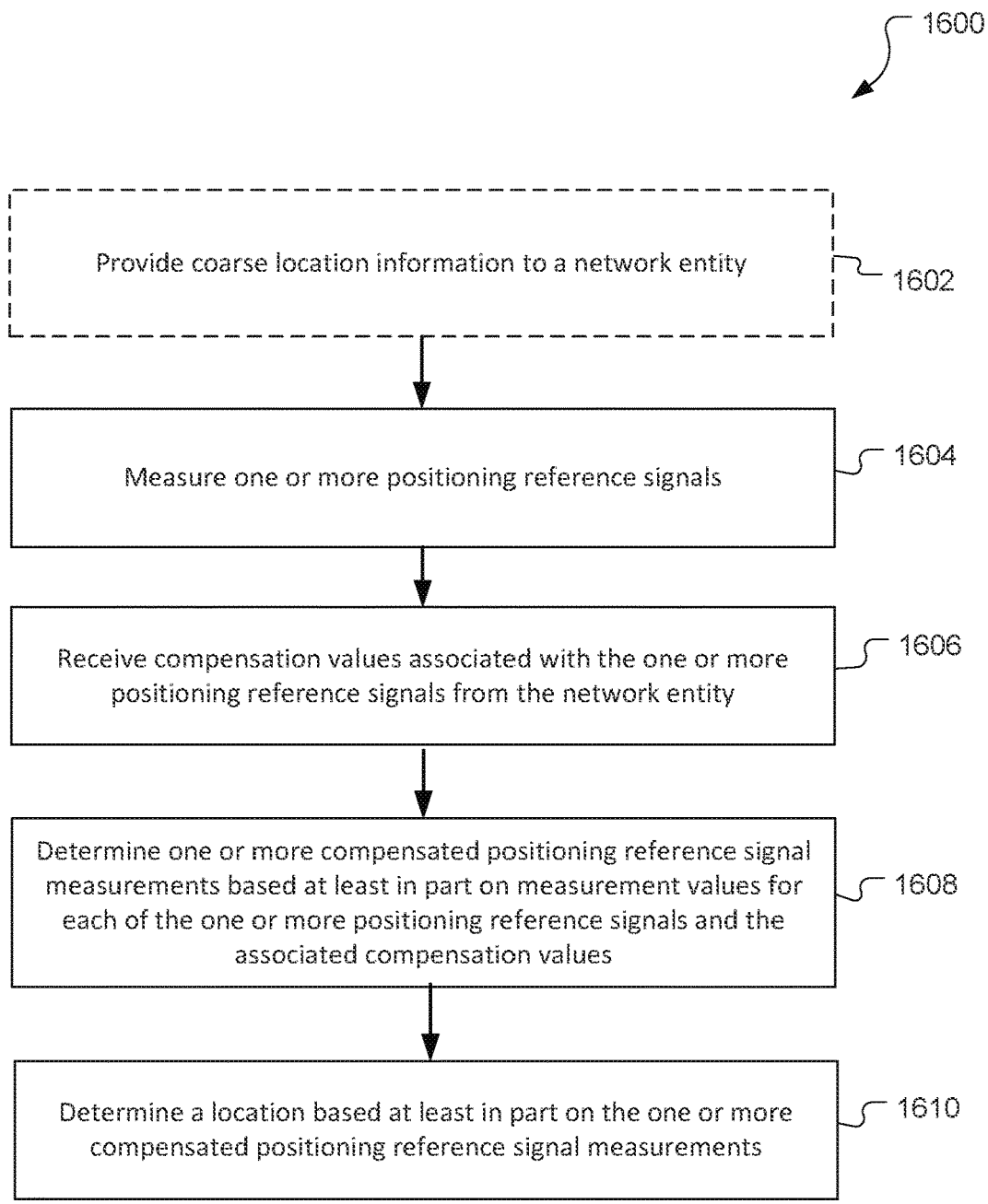
FIG. 16 is a process flow for an example method for determining a location of a user equipment.

Referring to FIG. 16, with further reference to FIGS. 1-14, a method 1600 for determining a location of a user equipment includes the stages shown. The method 1600 is, however, an example only and not limiting. The method 1600 may be altered, e.g., by having stages added, removed, rearranged, combined, performed concurrently, and/or having single stages split into multiple stages.

At stage 1602, the method may optionally include providing coarse location information to a network entity. A UE 200, such as the target UE 1305, is a means for providing the coarse location information. In an example, the target UE 1305 may be configured to provide identification information of a serving cell to a network entity such as the LMF 120 or a reference node 1310a, and the coarse location of the UE may be based on the coverage area of the serving cell. The target UE 1305 may be configured to provide identification information with one or more base stations (e.g. BS ID) and/or PRS resources (e.g., PRS ID) received by the UE and the network entity may determine a coarse location of the target UE 1305 based on the station and resource identification information. In an example, the target UE 1305 may include an IMU 270 and the coarse location may be based on inertial navigation measurements (e.g., dead reckoning). The presence of one or more primary and/or sidelink signals (e.g., associated with other network stations at known locations) may also be used to determine the coarse location of the target UE 1305. Other terrestrial and satellite navigation techniques may also be used to determine the coarse location of the target UE 1305. The LMF 120 may be configured to determine the coarse location of the target UE 1305.

At stage 1604, the method includes measuring one or more positioning reference signals. The target UE 1305 is a means for measuring one or more PRS. The target UE 1305 is configured to obtain PRS measurements from the PRS resources transmitted from base stations in the network. For example, the target UE 1305 may determine the ToA of PRS resources, RSTD and/or RTT values associated with pairs of PRS resources, and other positioning information such as RSSI and AoA as known in the art.

At stage 1606, the method includes receiving compensation values associated with the one or more positioning reference signals from the network entity. The target UE 1305 is a means for receiving the compensation values. In an example, the one or more reference nodes may provide ToA, RSTD and/or RTT measurements for specific PRS resources and resource pairs, as well as location information, to the network entity, such as the LMF 120, the TRP 300, or a UE 200. In an example, the reference node may provide the compensation values directly to the target UE 1305 (e.g., via sidelink 1312 or other messaging protocols). In an embodiment, the LMF 120 may receive ToA, RSTD, and/or RTT measurement information from the reference nodes and may be configured to determine time compensation values based on the measurement information and the locations of the reference nodes. In an example, the reference nodes may be configured to provide location information (e.g., based on PPP, RTK, etc.) with the PRS measurement information. In an example, a UE 200 may be configured to determine the one or more compensation values and provide them to the target UE 1305 directly via sidelink communications (e.g., D2D).

At stage 1608, the method includes determining one or more compensated positioning reference signal measurements based at least in part on the measurement values for each of the one or more positioning reference signals and the associated compensation values. The target UE 1305 is a means for determining the one or more compensated PRS measurements. In an example, the compensation values are time values associated with a PRS resource (e.g., for a ToA measurement), or a pair of PRS resources (e.g., for RSTD measurements). The target UE 1305 may be configured to apply the time values to the measured ToA and/or RSTD measurements obtained at stage 1604 to generate the one or more compensated PRS measurements. Since the time values are associated with the PRS resource, the compensated PRS measurements are corrected for at least a portion of the group delay in the transmitting base station.

At stage 1610, the method includes determining a location based at least in part on the one or more compensated positioning signal measurements. The target UE 1305 is a means for determining a location based on the compensated PRS measurements. The compensated PRS measurements may be used to determine the ranges between one or more stations. Using the respective ranges to the stations as a radius, a circular representation of the area around the base stations may be used to determine a position estimate for the target UE 1305 (e.g., using trilateration). Additional corrected PRS measurements to other stations may be used (e.g., using multi-lateration techniques). In an example, the LMF 120 may receive the compensated PRS measurements computed by the target UE 1305 and be configured to determine the location of the target UE 1305 based on the compensated PRS measurements. Other network entities may also be configured to assist the UE in determining a location based on the compensated PRS measurements computed by the target UE 1305.

Figure 17:
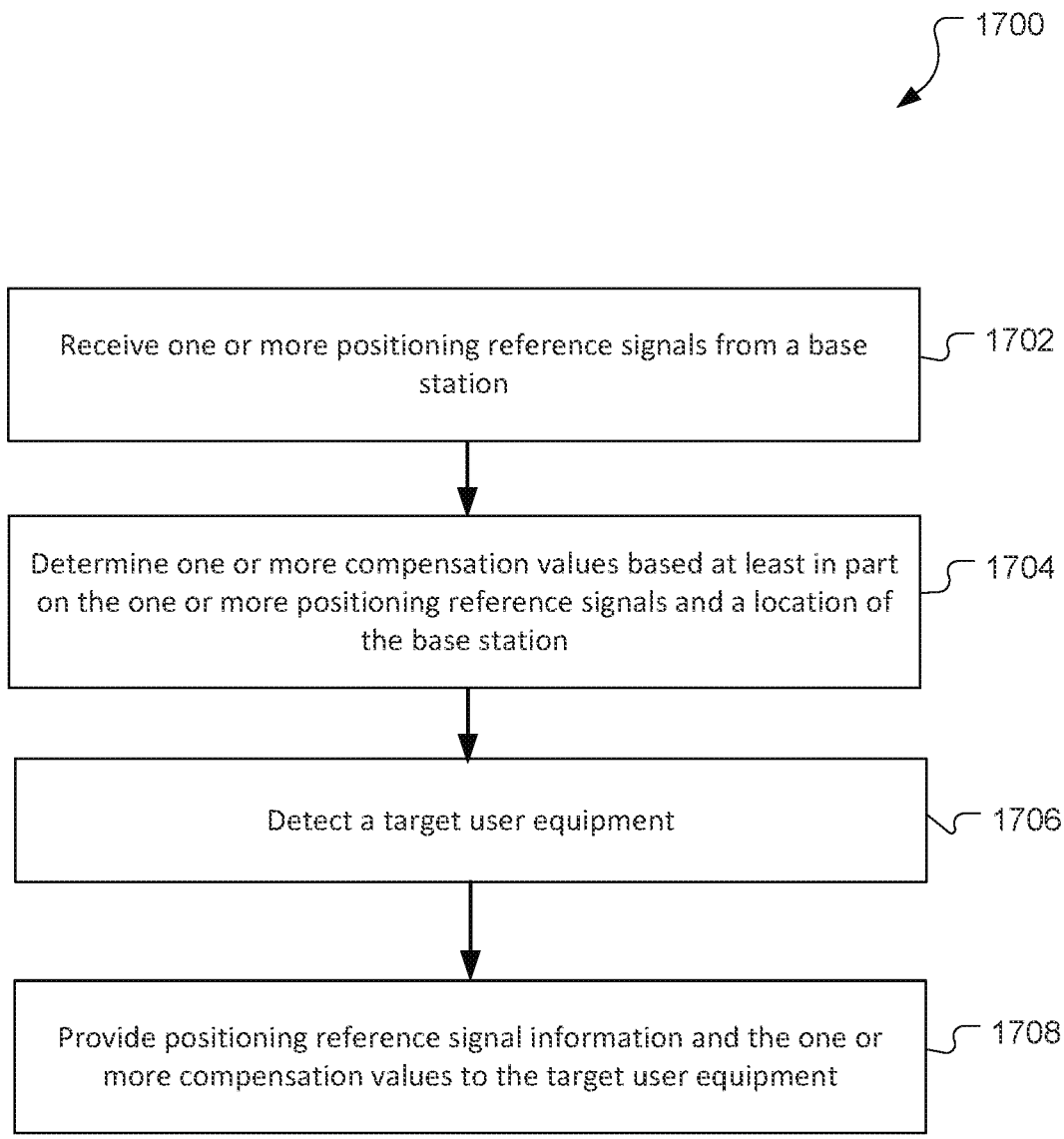
FIG. 17 is a process flow for an example method for reference node selection in a double difference positioning method.

Referring to FIG. 17, with further reference to FIGS. 1-14, a method for reference node selection in a double difference positioning method includes the stages shown. The method 1700 is, however, an example only and not limiting. The method 1700 may be altered, e.g., by having stages added, removed, rearranged, combined, performed concurrently, and/or having single stages split into multiple stages.

At stage 1702, the method includes receiving one or more positioning reference signals from a base station. A reference node 1310a, such as a UE 200 or a TRP 300, is a means for receiving one or more PRS. The reference node 1310a may receive PRS resources from a plurality of base stations, such as gNBi, gNBj and gNBk. In an example, the LMF 120 may be configured to provide assistance data to the reference node 1310a via communication protocols such as NRPPa, LPP, RRC, etc., and the reference node 1310a may receive the PRS resources based at least in part on the assistance data. In an example, the assistance data may include location information for the base stations.

At stage 1704, the method includes determining one or more compensation values based at least in part on the one or more positioning reference signals and a location of the base station. The reference node 1310a is a means for determining one or more compensation values. In an example, the location of the reference node 1310a is known to a higher degree of accuracy as compared to a target UE. The reference node may be configured to determine expected ToA and RSTD values for the PRS signals received at stage 1702 based on the locations of the base stations and the location of the reference node 1310a (e.g., equation 1). The one or more compensation values are based at least in part on the difference between the expected and measured values. The compensation values may be associated with a PRS resource (e.g., ToA correction) and PRS resource pairs (e.g., RSTD correction).

At stage 1706, the method includes detecting a target user equipment. The reference node 1310a is a means for detecting a target UE. In an example, the reference node 1310a may detect the target UE 1305 based on the D2D link 1312. That is, the D2D link 1312 may be used to determine that the target UE 1305 is proximate to the reference node 1310a. In an example, the target UE 1305 may be configured to provide location information via the D2D link 1312. In an embodiment, the reference node 1310a may be configured to detect a target UE based on information provided by a network entity, such as the LMF 120. The LMF 120 may be configured to provide assistance data indicating that the reference node 1310a is to provide compensation values, and the LMF 120 may provide the compensation values to the target UE 1305.

At stage 1708, the method includes providing positioning reference signal information and the one or more compensation values to the target user equipment. The reference node 1310a is a means for providing PRS information and compensation values to the target UE. In an example, the reference node 1310a may provide the compensation values determined at stage 1704, and the corresponding PRS identification information to the target UE 1305. The reference node 1310a may utilize the D2D link 1312 and/or other network protocols to provide the PRS information and the associated compensation values. In an example, the LMF 120 may be used to provide the PRS and compensation values to the target UE 1305.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300 or the UE 200.

Components, functional or otherwise, shown in the figures and/or discussed herein as being connected or communicating with each other are communicatively coupled unless otherwise noted. That is, they may be directly or indirectly connected to enable communication between them.

As used herein, unless otherwise stated, a statement that a function or operation is "based on" an item or condition means that the function or operation is based on the stated item or condition and may be based on one or more items and/or conditions in addition to the stated item or condition.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following number clauses:

1. A method of determining compensation values for positioning reference signals, comprising:
   determining one or more reference nodes based on a coarse location of a target user equipment;
   receiving positioning reference signal measurements from the one or more reference nodes; and
   determining one or more compensation values based at least in part on the positioning reference signal measurements.

2. The method of clause 1 further comprising providing the one or more compensation values to the target user equipment.

3. The method of clause 1 wherein determining the one or more reference nodes includes determining one or more positioning reference signal resources based on the coarse location of the target user equipment.

4. The method of clause 3 wherein determining the one or more reference nodes includes determining the one or more positioning reference signal resources utilizing a detectable line-of-sight path to the one or more reference nodes.

5. The method of clause 4 wherein determining the one or more reference nodes includes determining a reference node with a greatest number of the one or more positioning reference signal resources with the detectable line-of-sight path to the reference node.

6. The method of clause 3 wherein determining the one or more reference nodes includes determining a reference node with a greatest number of the one or more positioning reference signal resources that are detectable by the reference node.

7. The method of claim 3 wherein determining the one or more reference nodes includes determining a reference nodes with a maximum number of overlapped positioning reference signal measurements with the target user equipment.

8. The method of clause 1 wherein the one or more compensation values include a time compensation value associated with a time of arrival of a positioning reference signal resource.

9. The method of clause 1 wherein the one or more compensation values include a time compensation value based on a reference signal time difference associated with two positioning reference signal resources.

10. The method of clause 1 wherein the coarse location of the target user equipment is based on an identification value associated with a current serving cell.

11. The method of clause 1 further comprising receiving the coarse location of the target user equipment from a network station.

12. The method of clause 1 further comprising providing positioning reference signal resource configuration information to the target user equipment based at least in part on the one or more reference nodes.

13. A method of determining a location with a user equipment, comprising:
    measuring one or more positioning reference signals;
    receiving compensation values associated with the one or more positioning reference signals from a network entity;
    determining one or more compensated positioning reference signal measurements based at least in part on measurement values for each of the one or more positioning reference signals and the associated compensation values; and
    determining the location based at least in part on the one or more compensated positioning reference signal measurements.

14. The method of clause 13 further comprising providing coarse location information to the network entity.

15. The method of clause 13 wherein measuring the one or more positioning reference signals includes determining a time of arrival for a positioning reference signal.

16. The method of clause 13 wherein measuring the one or more positioning reference signals includes determining a reference signal time difference for at least two positioning reference signals.

17. The method of clause 13 wherein receiving the compensation values includes receiving the compensation values from a location server.

18. The method of clause 13 wherein receiving the compensation values includes receiving the compensation values from a reference node.

19. The method of clause 13 wherein receiving the compensation values includes receiving the compensation values via a sidelink protocol.

20. The method of clause 13 wherein receiving the compensation values includes receiving the compensation values via one or more radio resource control messages.

21. The method of clause 13 wherein the compensation values are based on positioning reference signal measurements obtained from a plurality of reference nodes.

22. The method of clause 13 wherein determining the location includes providing the one or more compensated positioning reference signal measurements to a location server and receiving the location from the location server.

23. An apparatus, comprising:
    a memory;
    at least one transceiver;
    at least one processor communicatively coupled to the memory and the at least one transceiver, and configured to:
    determine one or more reference nodes based on a coarse location of a target user equipment;
    receive positioning reference signal measurements from the one or more reference nodes; and
    determine one or more compensation values based at least in part on the positioning reference signal measurements.

24. The apparatus of clause 23 wherein the at least one processor is further configured to provide the one or more compensation values to the target user equipment.

25. The apparatus of clause 23 wherein the at least one processor is further configured to determine one or more positioning reference signal resources based on the coarse location of the target user equipment.

26. The apparatus of clause 25 wherein the at least one processor is further configured to determine the one or more positioning reference signal resources utilizing a detectable line-of-sight path to the one or more reference nodes.

27. The apparatus of clause 26 wherein the at least one processor is further configured to determine a reference node with a greatest number of the one or more positioning reference signal resources with the detectable line-of-sight path to the reference node.

28. The apparatus of clause 25 wherein the at least one processor is further configured to determine a reference node with a greatest number of the one or more positioning reference signal resources that are detectable by the reference node.

29. The apparatus of clause 25 wherein the at least one processor is further configured to determine a reference nodes with a maximum number of overlapped positioning reference signal measurements with a target user equipment.

30. The apparatus of clause 23 wherein the one or more compensation values include a time compensation value associated with a time of arrival of a positioning reference signal resource.

31. The apparatus of clause 23 wherein the one or more compensation values include a time compensation value based on a reference signal time difference associated with two positioning reference signal resources.

32. The apparatus of clause 23 wherein the coarse location of the target user equipment is based on an identification value associated with a current serving cell.

33. The apparatus of clause 23 wherein the at least one processor is further configured to receive the coarse location of the target user equipment from a network station.

34. The apparatus of clause 23 wherein the at least one processor is further configured to provide positioning reference signal resource configuration information to the target user equipment based at least in part on the one or more reference nodes.

35. An apparatus, comprising:
a memory;
at least one transceiver;
at least one processor communicatively coupled to the memory and the at least one transceiver, and configured to:
measure one or more positioning reference signals;
receive compensation values associated with the one or more positioning reference signals from a network entity;
determine one or more compensated positioning reference signal measurements based at least in part on measurement values for each of the one or more positioning reference signals and the associated compensation values; and
determine a location based at least in part on the one or more compensated positioning reference signal measurements.

36. The apparatus of clause 35 wherein the at least one processor is further configured to provide coarse location information to the network entity.

37. The apparatus of clause 35 wherein the at least one processor is further configured to determine a time of arrival for a positioning reference signal.

38. The apparatus of clause 35 wherein the at least one processor is further configured to determine a reference signal time difference for at least two positioning reference signals.

39. The apparatus of clause 35 wherein the at least one processor is further configured to receive the compensation values from a location server.

40. The apparatus of clause 35 wherein the at least one processor is further configured to receive the compensation values from a reference node.

41. The apparatus of clause 35 wherein the at least one processor is further configured to receiving the compensation values via a sidelink protocol.

42. The apparatus of clause 35 wherein the at least one processor is further configured to receive the compensation values via one or more radio resource control messages.

43. The apparatus of clause 35 wherein the compensation values are based on positioning reference signal measurements obtained from a plurality of reference nodes.

44. The apparatus of clause 35 wherein the at least one processor is further configured to provide the one or more compensated positioning reference signal measurements to a location server and receiving the location from the location server.

45. An apparatus for determining compensation values for positioning reference signals, comprising:
means for determining one or more reference nodes based on a coarse location of a target user equipment;
means for receiving positioning reference signal measurements from the one or more reference nodes; and
means for determining one or more compensation values based at least in part on the positioning reference signal measurements.

46. An apparatus for determining a location with a user equipment, comprising:
means for measuring one or more positioning reference signals;
means for receiving compensation values associated with the one or more positioning reference signals from a network entity;
means for determining one or more compensated positioning reference signal measurements based at least in part on measurement values for each of the one or more positioning reference signals and the associated compensation values; and
means for determining the location based at least in part on the one or more compensated positioning reference signal measurements.

47. A non-transitory processor-readable storage medium comprising processor-readable instructions to cause one or more processors to determine compensation values for positioning reference signals, comprising:
code for determining one or more reference nodes based on a coarse location of a target user equipment;
code for receiving positioning reference signal measurements from the one or more reference nodes; and
code for determining one or more compensation values based at least in part on the positioning reference signal measurements.

48. A non-transitory processor-readable storage medium comprising processor-readable instructions to cause one or more processors to determine a location with a user equipment, comprising:
code for measuring one or more positioning reference signals;
code for receiving compensation values associated with the one or more positioning reference signals from a network entity;
code for determining one or more compensated positioning reference signal measurements based at least in part on measurement values for each of the one or more positioning reference signals and the associated compensation values; and
code for determining the location based at least in part on the one or more compensated positioning reference signal measurements.

The invention claimed is:
1. A method of determining compensation values for positioning reference signals, comprising:
determining one or more reference nodes;
receiving positioning reference signal measurements from the one or more reference nodes,
wherein the positioning reference signal measurements are based on time of arrival of one or more positioning reference signals; and
determining one or more compensation values based at least in part on the positioning reference signal measurements, wherein the one or more compensation values include a time compensation value based on a reference signal time difference associated with two positioning reference signal resources,
wherein determining the one or more reference nodes includes:
determining one or more positioning reference signal resources based on a coarse location of a target user equipment and
determining a reference node with a maximum number of overlapped positioning reference signal measurements with the target user equipment.

2. The method of claim 1 further comprising providing the one or more compensation values to a target user equipment.

3. The method of claim 1 wherein determining the one or more reference nodes includes determining the one or more positioning reference signal resources utilizing a detectable line-of-sight path to the one or more reference nodes.

4. The method of claim 3 wherein determining the one or more reference nodes includes determining a reference node with a greatest number of the one or more positioning reference signal resources with the detectable line-of-sight path to the reference node.

5. The method of claim 1 wherein determining the one or more reference nodes includes determining a reference node with a greatest number of the one or more positioning reference signal resources that are detectable by the reference node.

6. The method of claim 1 wherein a location management function or a transmission/reception point is configured for receiving the positioning reference signal measurements from the one or more reference nodes, and for determining the one or more compensation values.

7. The method of claim 1 wherein a user equipment is configured for receiving the positioning reference signal measurements from the one or more reference nodes, and for determining the one or more compensation values.

8. A method of determining a location with a user equipment, comprising:
measuring one or more positioning reference signals;
receiving compensation values associated with the one or more positioning reference signals from a network entity wherein the compensation values are based on positioning reference signal measurements obtained from a plurality of reference nodes, wherein the positioning reference signal measurements are based on time of arrival of one or more positioning reference signals and the compensation values include a time compensation value based on a reference signal time difference associated with two positioning reference signal resources;
determining one or more compensated positioning reference signal measurements based at least in part on measurement values for each of the one or more positioning reference signals and the associated compensation values; and
determining the location based at least in part on the one or more compensated positioning reference signal measurements,
wherein determination of the plurality of reference nodes reference nodes includes:
determination of one or more positioning reference signal resources based on a coarse location of the user equipment and
determination of a reference node with a maximum number of overlapped positioning reference signal measurements with the user equipment.

9. The method of claim 8 wherein measuring the one or more positioning reference signals includes determining a time of arrival for a positioning reference signal.

10. The method of claim 8 wherein measuring the one or more positioning reference signals includes determining a reference signal time difference for at least two positioning reference signals.

11. The method of claim 8 wherein receiving the compensation values includes receiving the compensation values from a location server.

12. The method of claim 8 wherein receiving the compensation values includes receiving the compensation values from a reference node.

13. The method of claim 8 wherein receiving the compensation values includes receiving the compensation values from a user equipment via a sidelink protocol.

14. The method of claim 8 wherein the compensation values are based on positioning reference signal measurements obtained from a plurality of reference nodes.

15. An apparatus, comprising:
a memory;
at least one transceiver;
at least one processor communicatively coupled to the memory and the at least one transceiver, and configured to:
determine one or more reference nodes;
receive positioning reference signal measurements from the one or more reference nodes,
wherein the positioning reference signal measurements are based on time of arrival of one or more positioning reference signals; and
determine one or more compensation values based at least in part on the positioning reference signal measurements, wherein the one or more compensation values include a time compensation value based on a reference signal time difference associated with two positioning reference signal resources,
wherein the at least one processor is further configured to determine the one or more reference nodes including:
determining one or more positioning reference signal resources based on a coarse location of a target user equipment and
determining a reference node with a maximum number of overlapped positioning reference signal measurements with the target user equipment.

16. The apparatus of claim 15 wherein the at least one processor is further configured to provide the one or more compensation values to a target user equipment.

17. The apparatus of claim 15 wherein the at least one processor is further configured to determine a reference node with a greatest number of positioning reference signal resources utilizes a detectable line-of-sight path to the reference node.

18. The apparatus of claim 15 wherein the at least one processor is further configured to determine a reference node with a greatest number of positioning reference signal resources that are detectable by the reference node.

19. The apparatus of claim 15 wherein the one or more compensation values include a time compensation value associated with a time of arrival of a positioning reference signal resource.

20. An apparatus, comprising:
a memory;
at least one transceiver;
at least one processor communicatively coupled to the memory and the at least one transceiver, and configured to:
measure one or more positioning reference signals;
receive compensation values associated with the one or more positioning reference signals from a network entity, wherein the compensation values are based on positioning reference signal measurements obtained from a plurality of reference nodes, wherein the positioning reference signal measurements are based on time of arrival of one or more positioning reference signals and the compensation values include a time compensation value based on a reference signal time difference associated with two positioning reference signal resources;
determine one or more compensated positioning reference signal measurements based at least in part on measurement values for each of the one or more positioning reference signals and the associated compensation values; and
determine a location based at least in part on the one or more compensated positioning reference signal measurements, wherein determination of the one or more reference nodes includes:
   determination of the one or more positioning reference signal resources based on a coarse location of the apparatus and
   determination of a reference node with a maximum number of overlapped positioning reference signal measurements with the apparatus.

21. The apparatus of claim 20 wherein the at least one processor is further configured to provide the coarse location information to the network entity.

22. The apparatus of claim 20 wherein the at least one processor is further configured to determine a time of arrival for a positioning reference signal.

23. The apparatus of claim 20 wherein the at least one processor is further configured to determine a reference signal time difference for at least two positioning reference signals.

24. The apparatus of claim 20 wherein the at least one processor is further configured to receive the compensation values from a location server.

25. The apparatus of claim 20 wherein the at least one processor is further configured to receive the compensation values from a transmission/reception point.

26. The apparatus of claim 20 wherein the at least one processor is further configured to receiving the compensation values from a user equipment via a sidelink protocol.

* * * * *